Figure 3A:
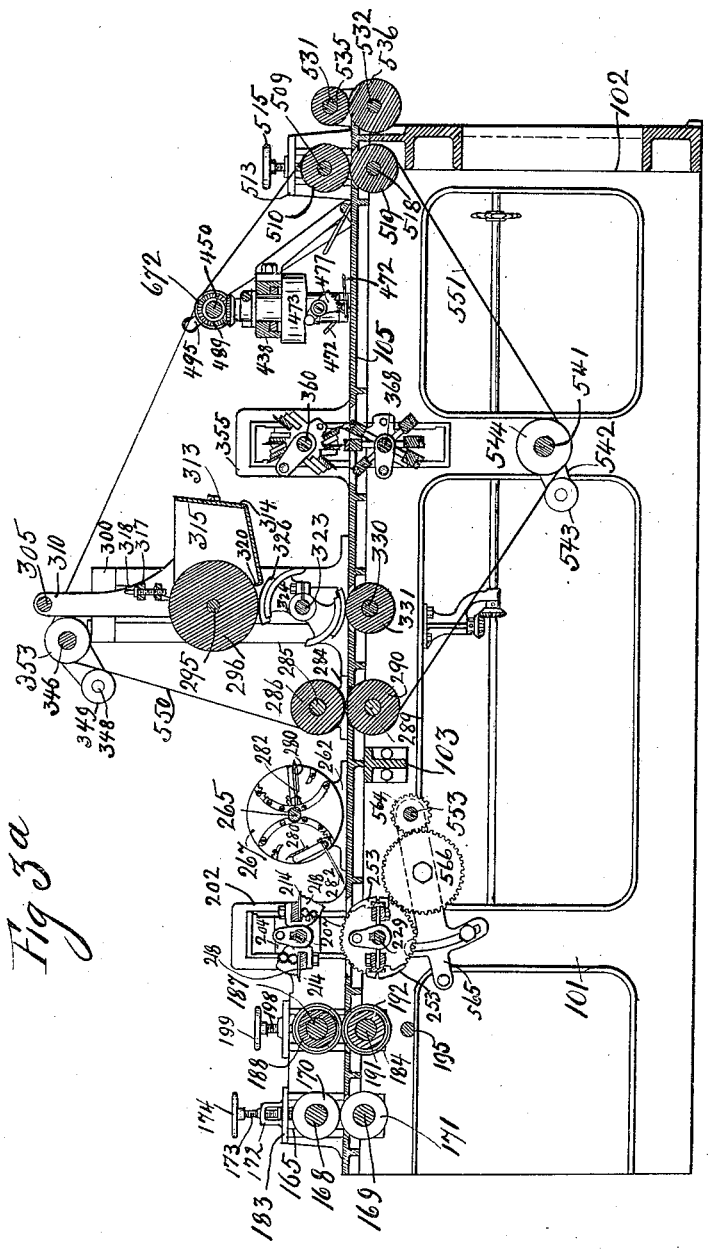

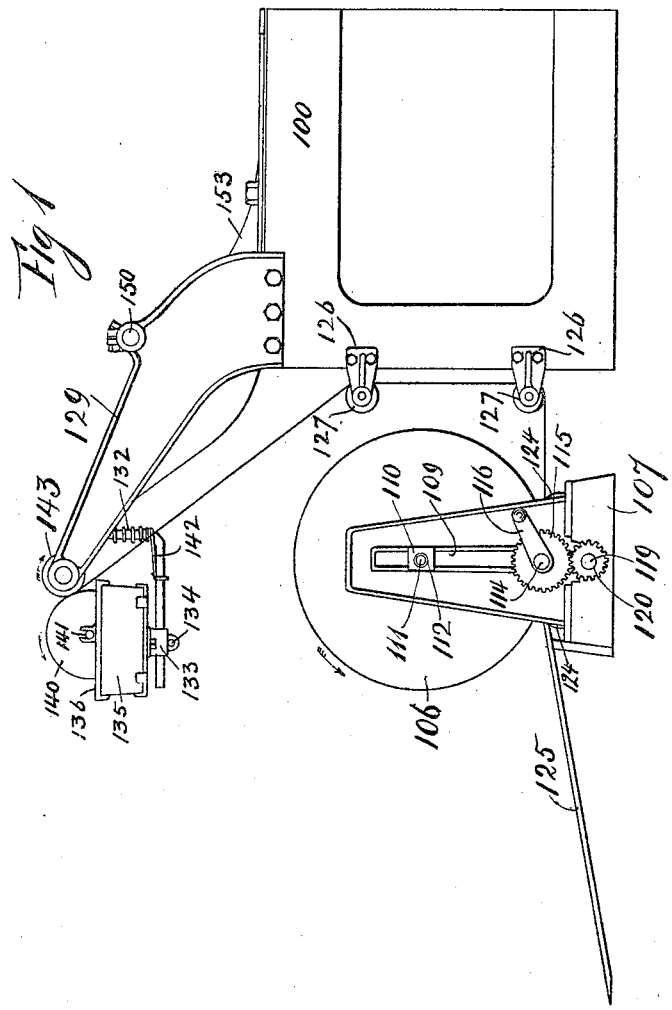

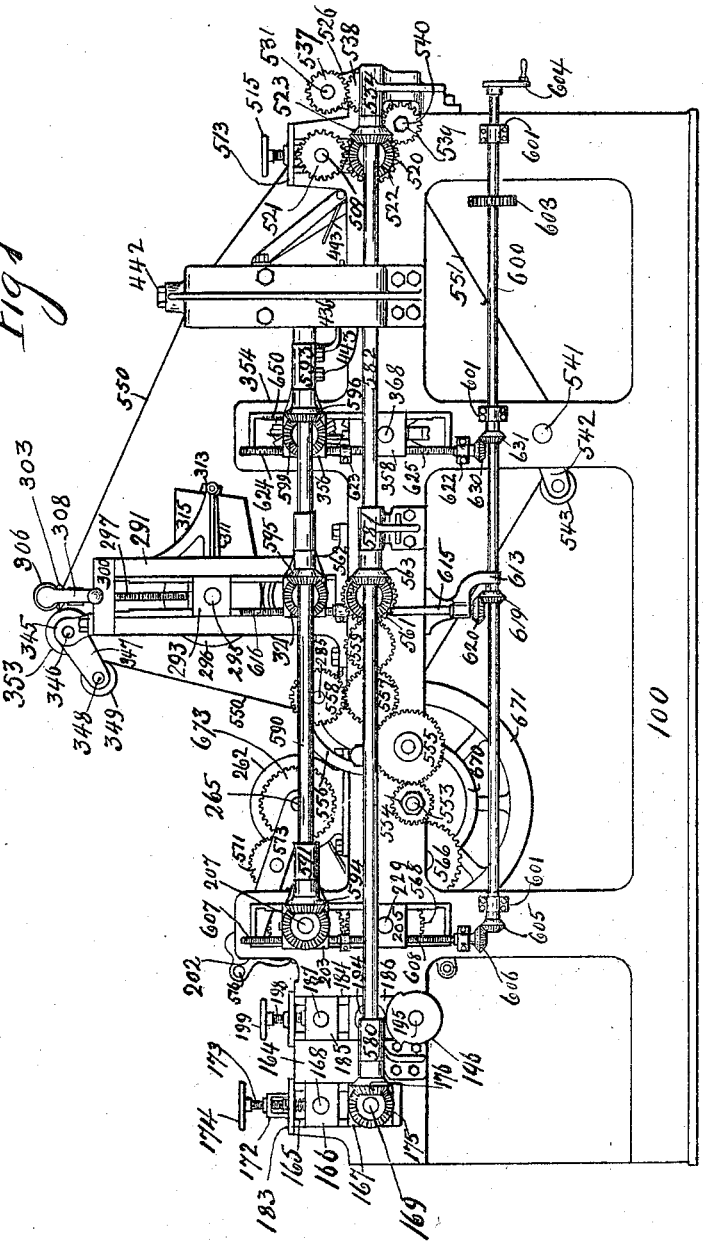

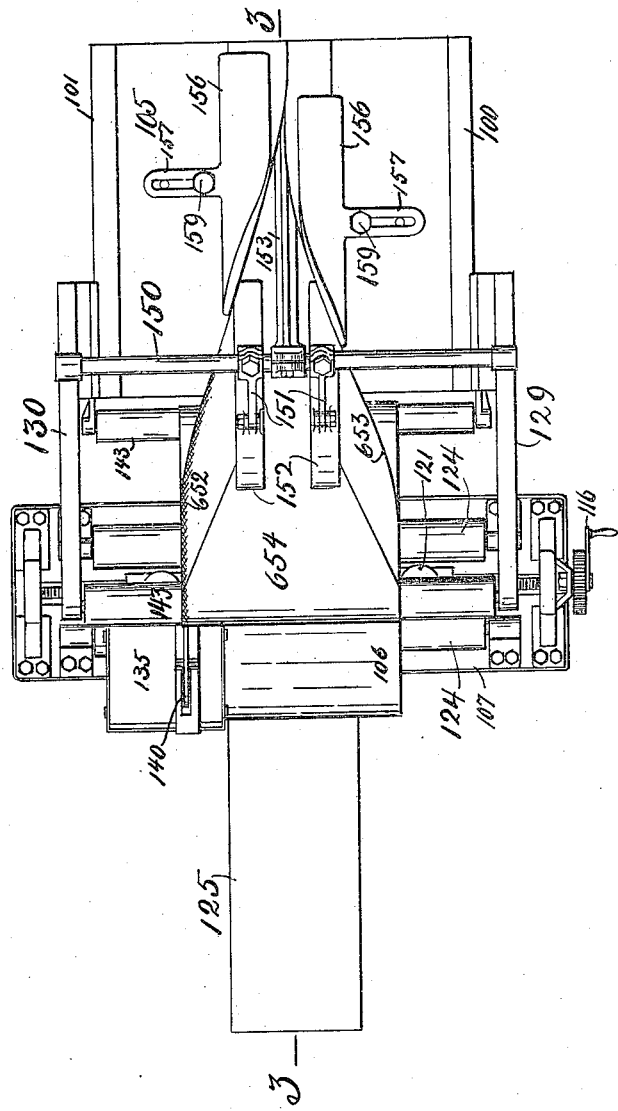

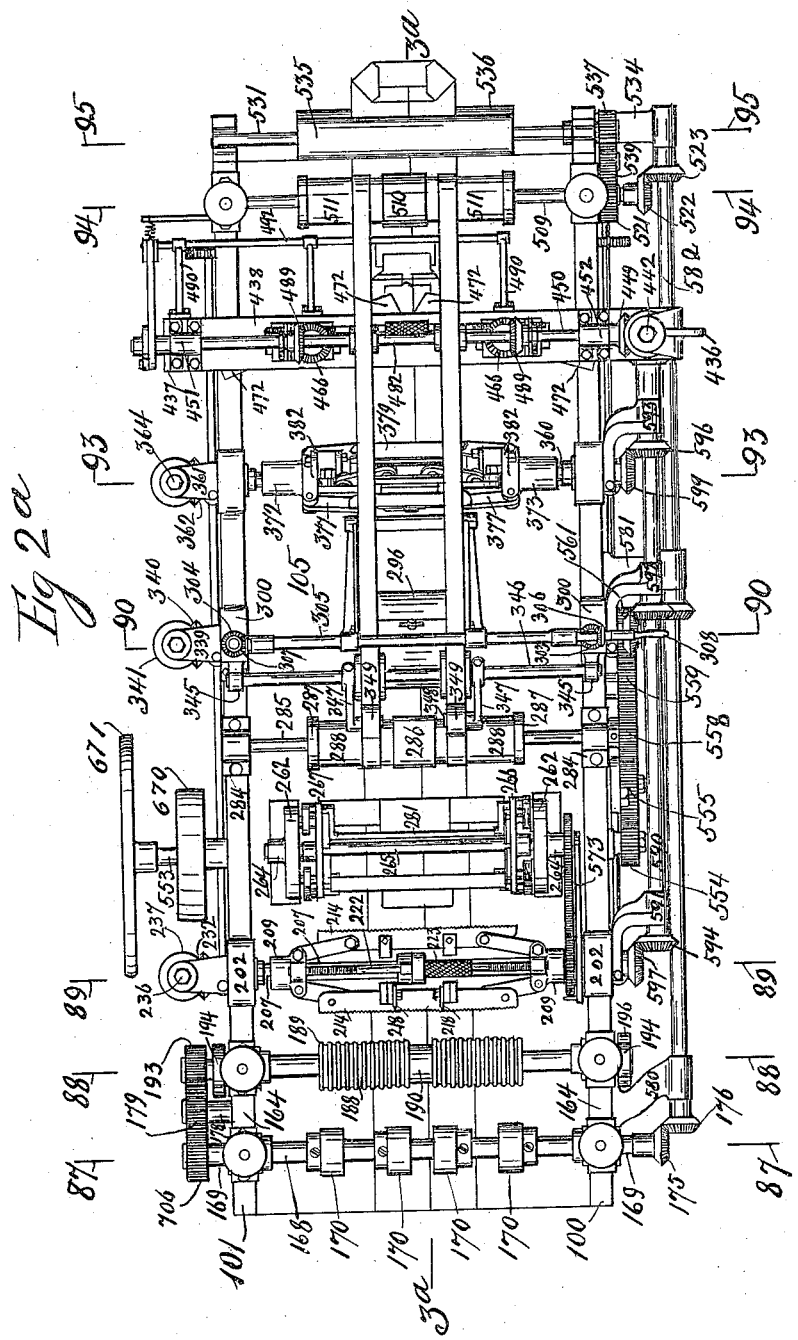

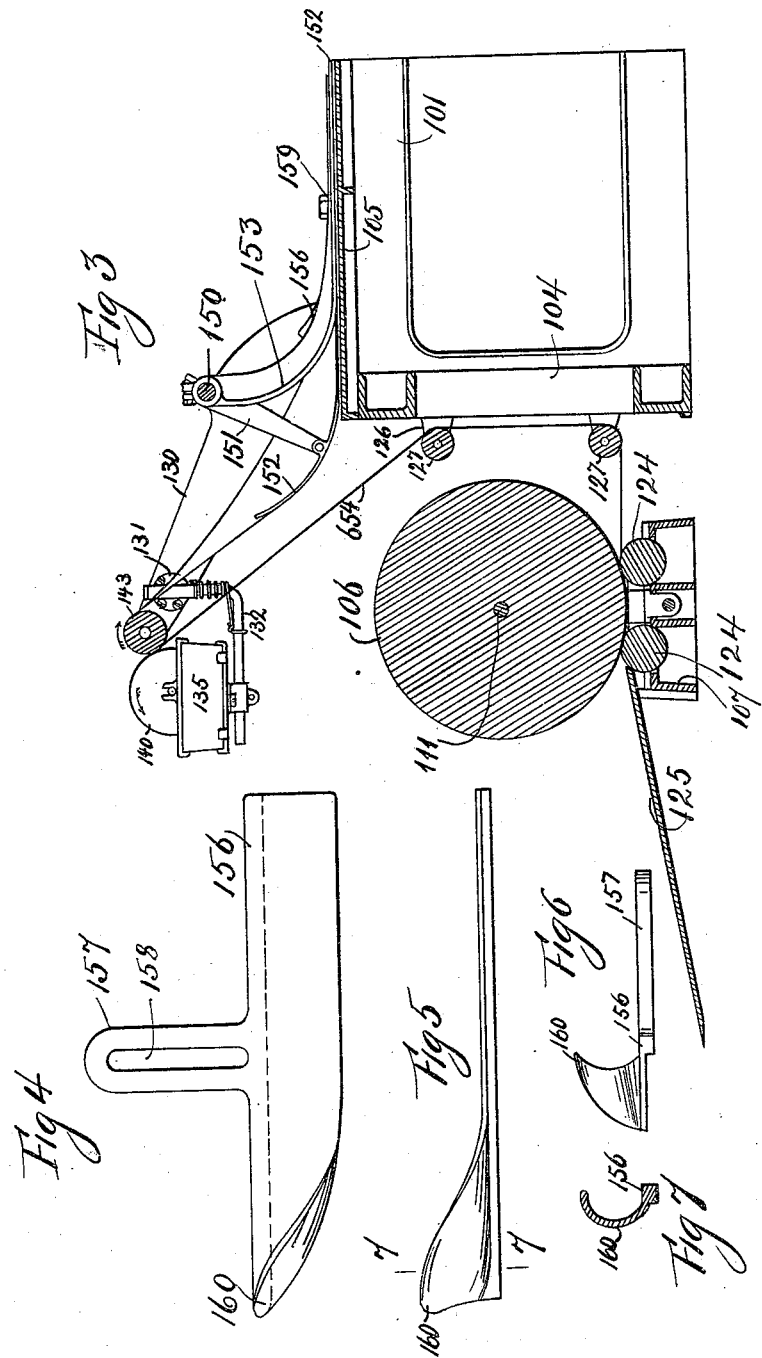

A. J. WIKANDER.
BAG MAKING MACHINE.
APPLICATION FILED FEB. 4, 1907.

945,832.

Patented Jan. 11, 1910.
26 SHEETS—SHEET 6.

Witnesses
M. Zimansky
John J. Miller

Inventor
Anders Johan Wikander
By his Attorney
A. A. de Bonneville

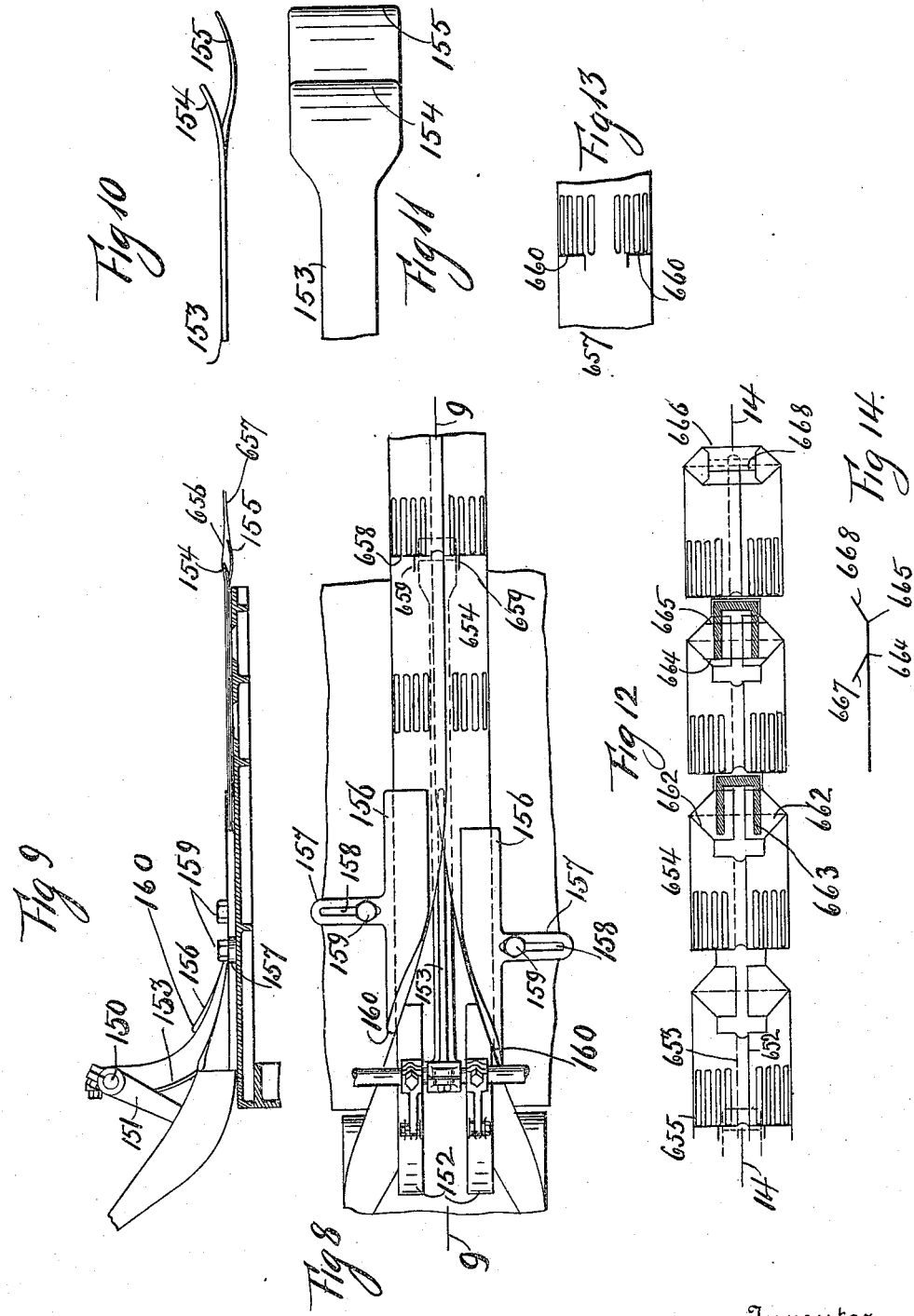

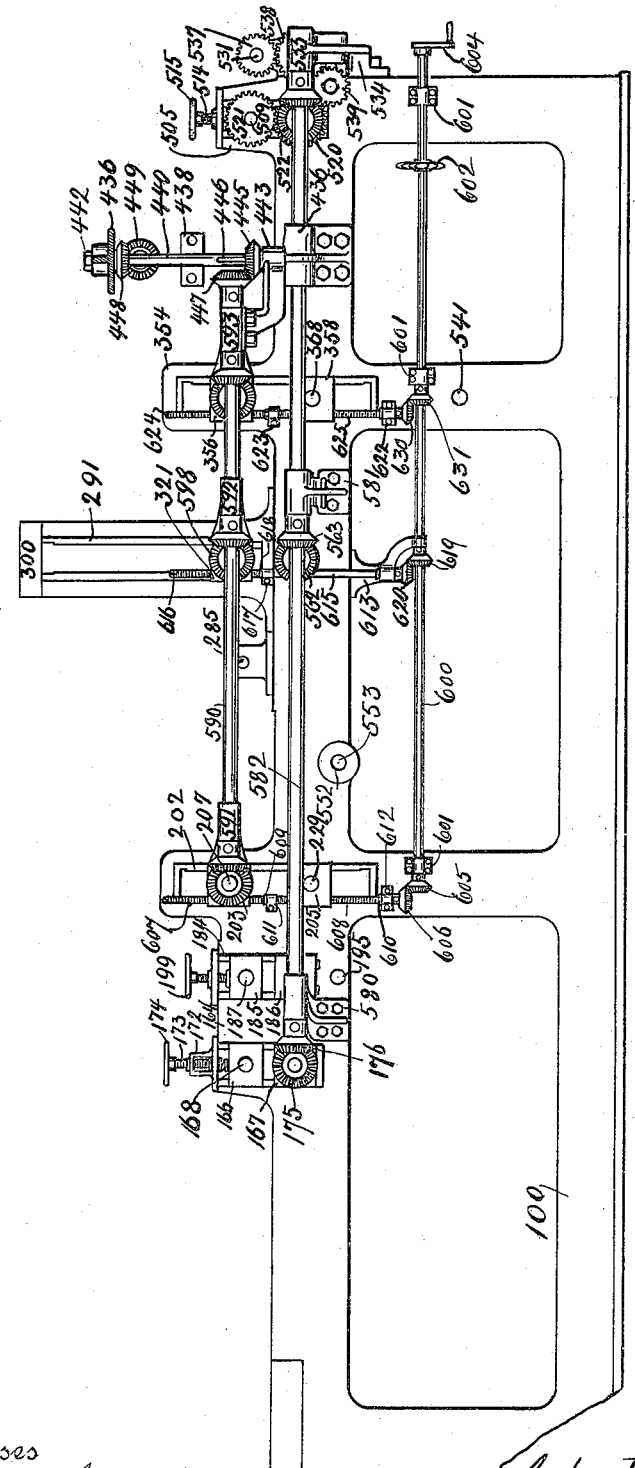

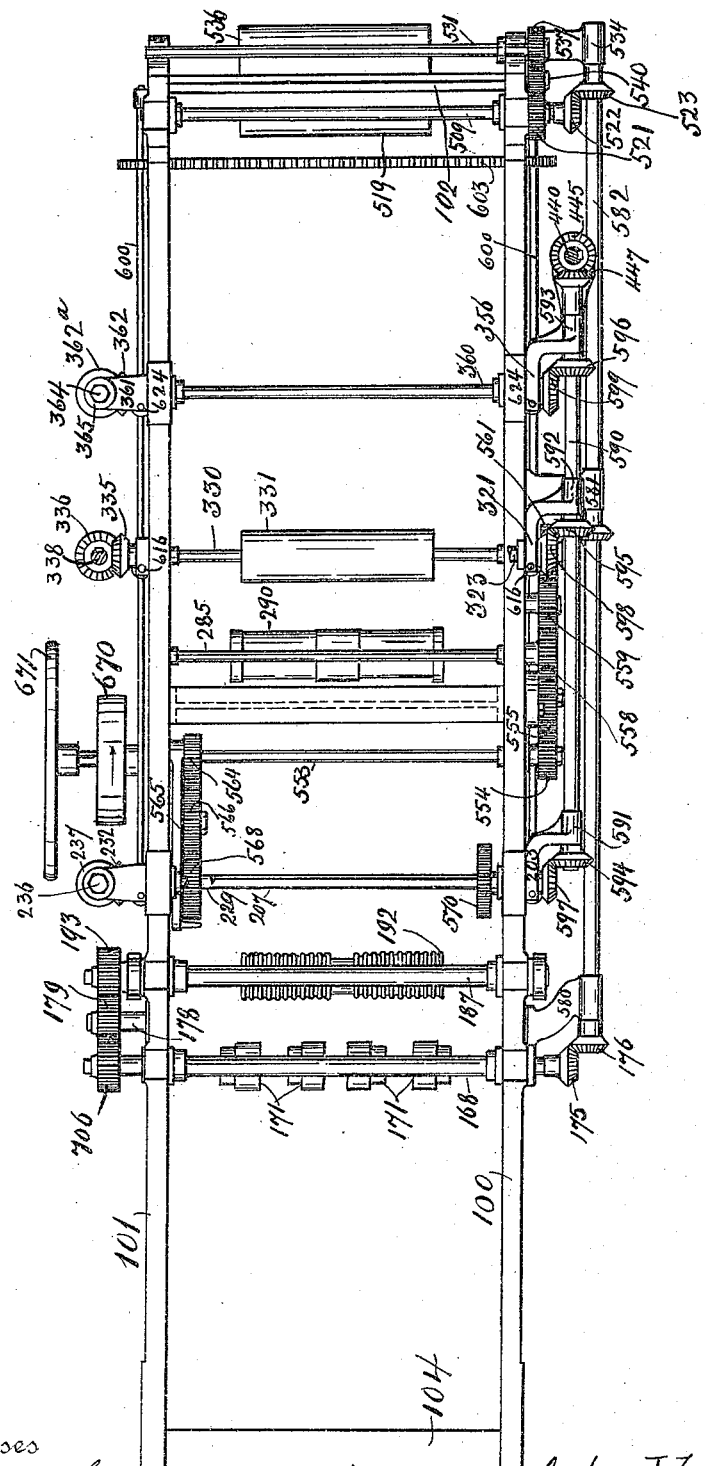

A. J. WIKANDER.
BAG MAKING MACHINE.
APPLICATION FILED FEB. 4, 1907.
945,832.
Patented Jan. 11, 1910.
26 SHEETS—SHEET 10.
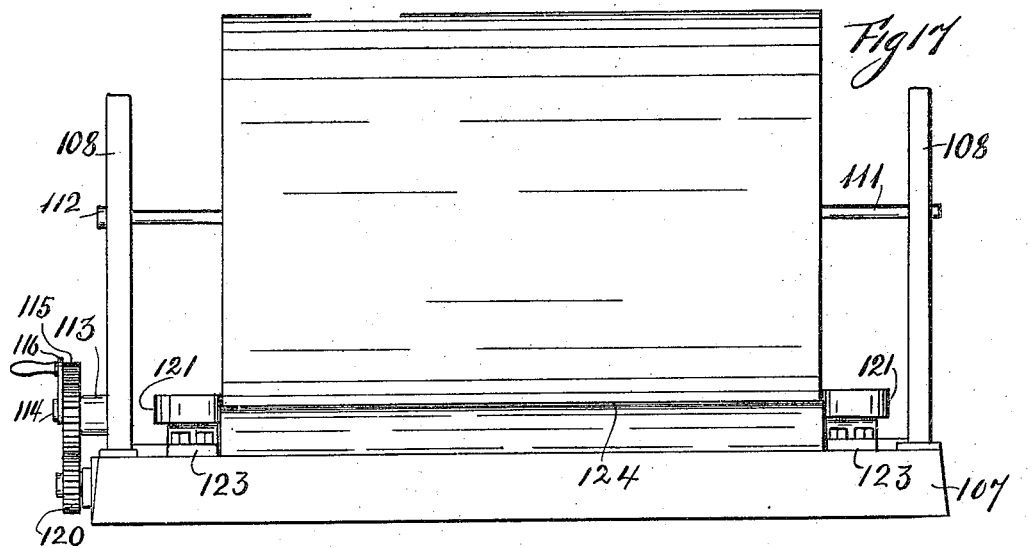
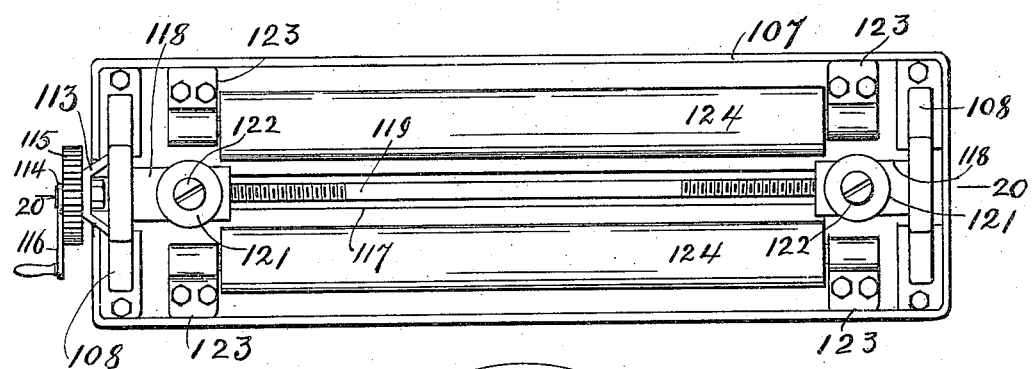
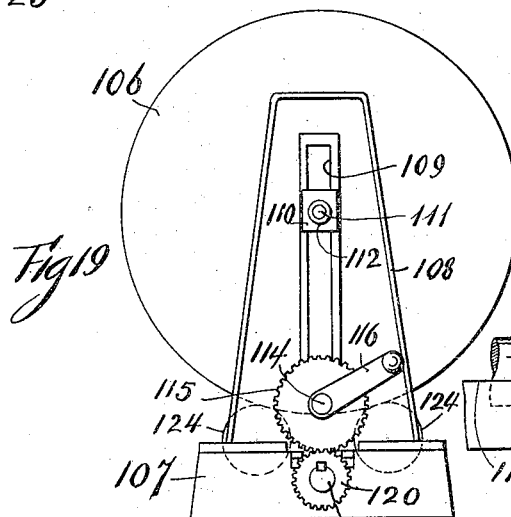
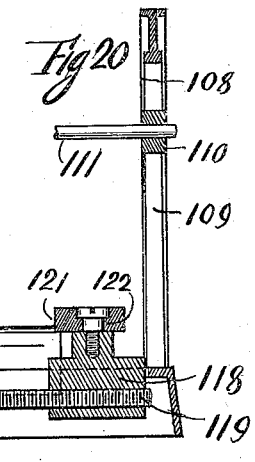
Witnesses
M. Zimansky.
John Miller
Inventor
Anders Johan Wikander
By his Attorney
Art de Bonneville A. J. WIKANDER.
BAG MAKING MACHINE.
APPLICATION FILED FEB. 4, 1907.
945,832.
Patented Jan. 11, 1910.
26 SHEETS—SHEET 11.
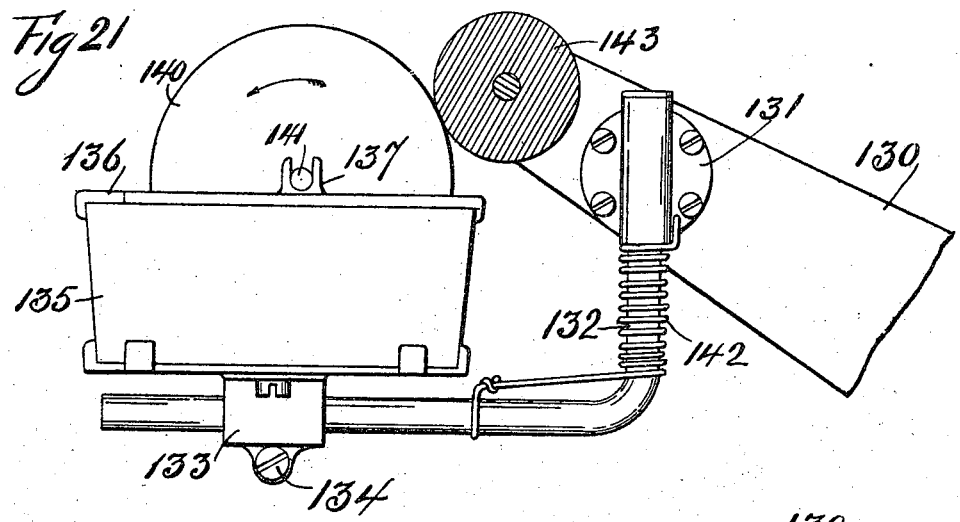
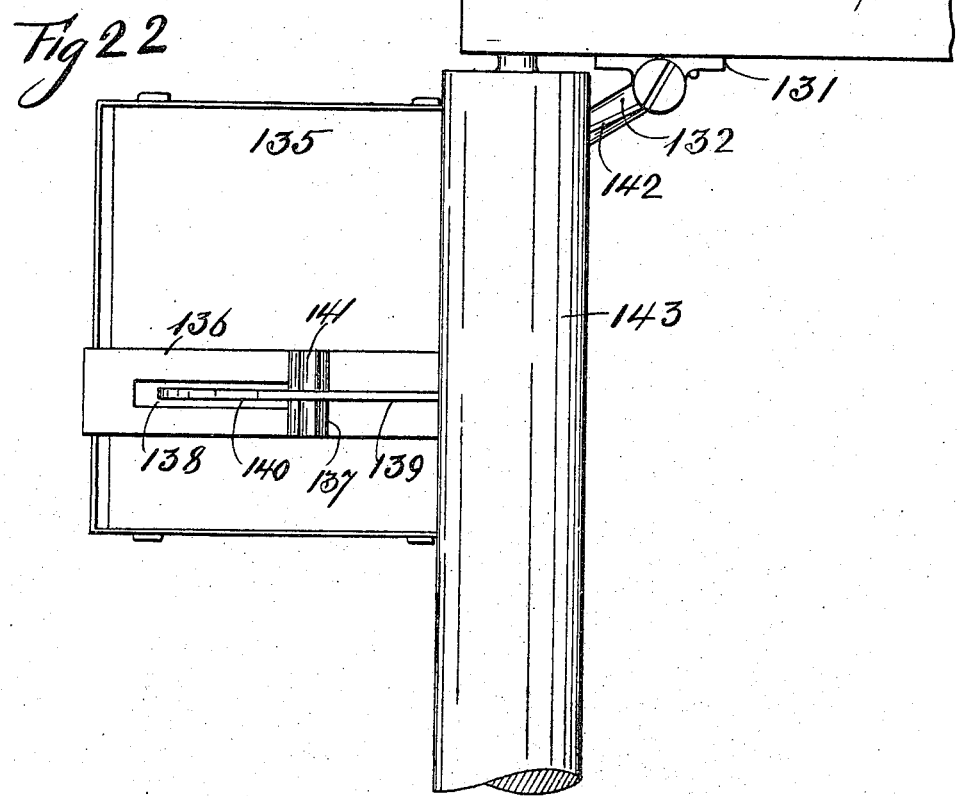
Witnesses
M. Zimansky
John J. Miller
Inventor
Anders Johan Wikander
By his Attorney
A. H. de Bonneville A. J. WIKANDER.
BAG MAKING MACHINE.
APPLICATION FILED FEB. 4, 1907.
945,832.
Patented Jan. 11, 1910.
26 SHEETS—SHEET 12.
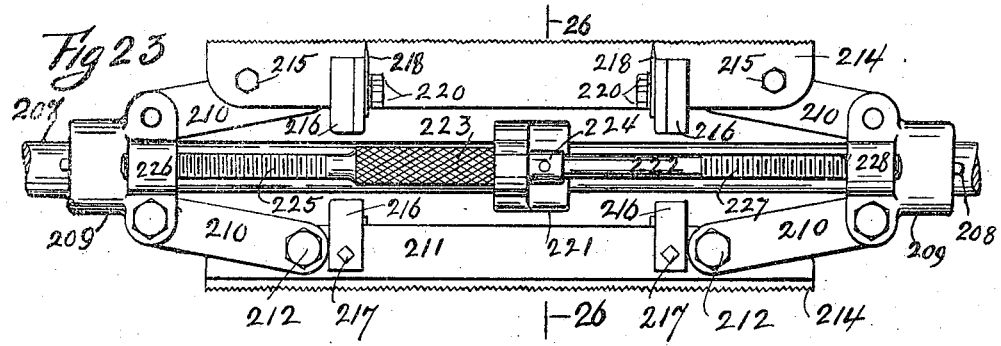
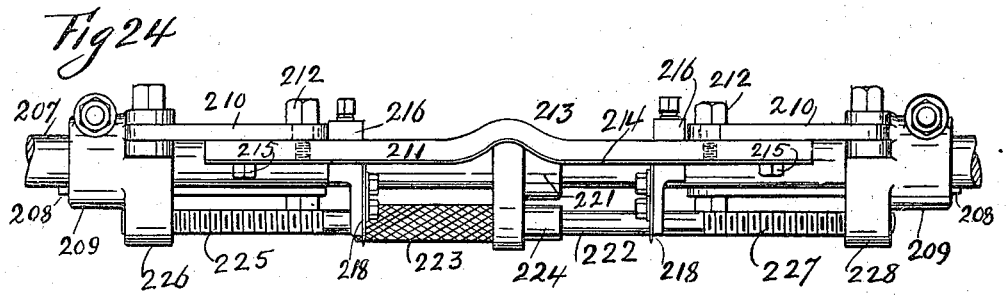
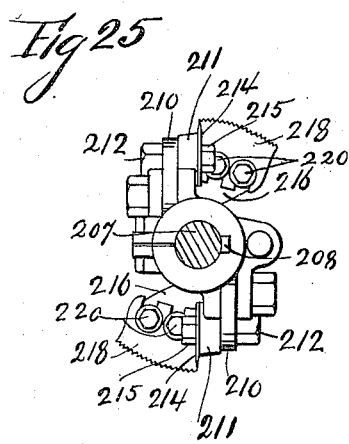
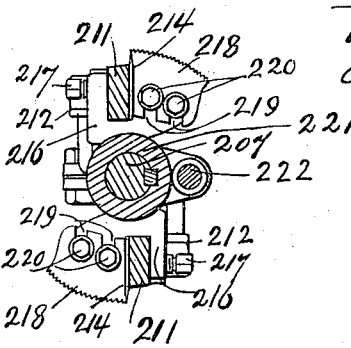
Witnesses
M. Zimansky.
John J. Miller
Inventor
Anders Johan Wikander
By his Attorney
A. L. de Bonneville

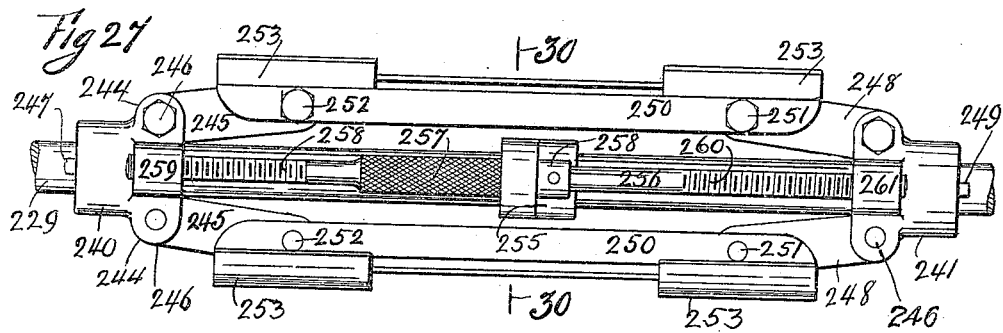
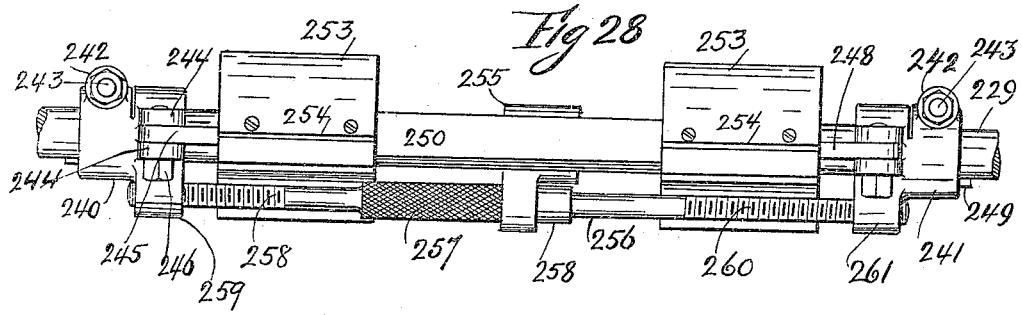
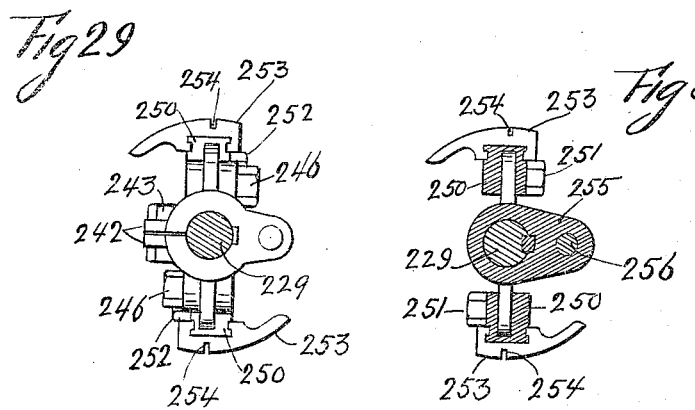

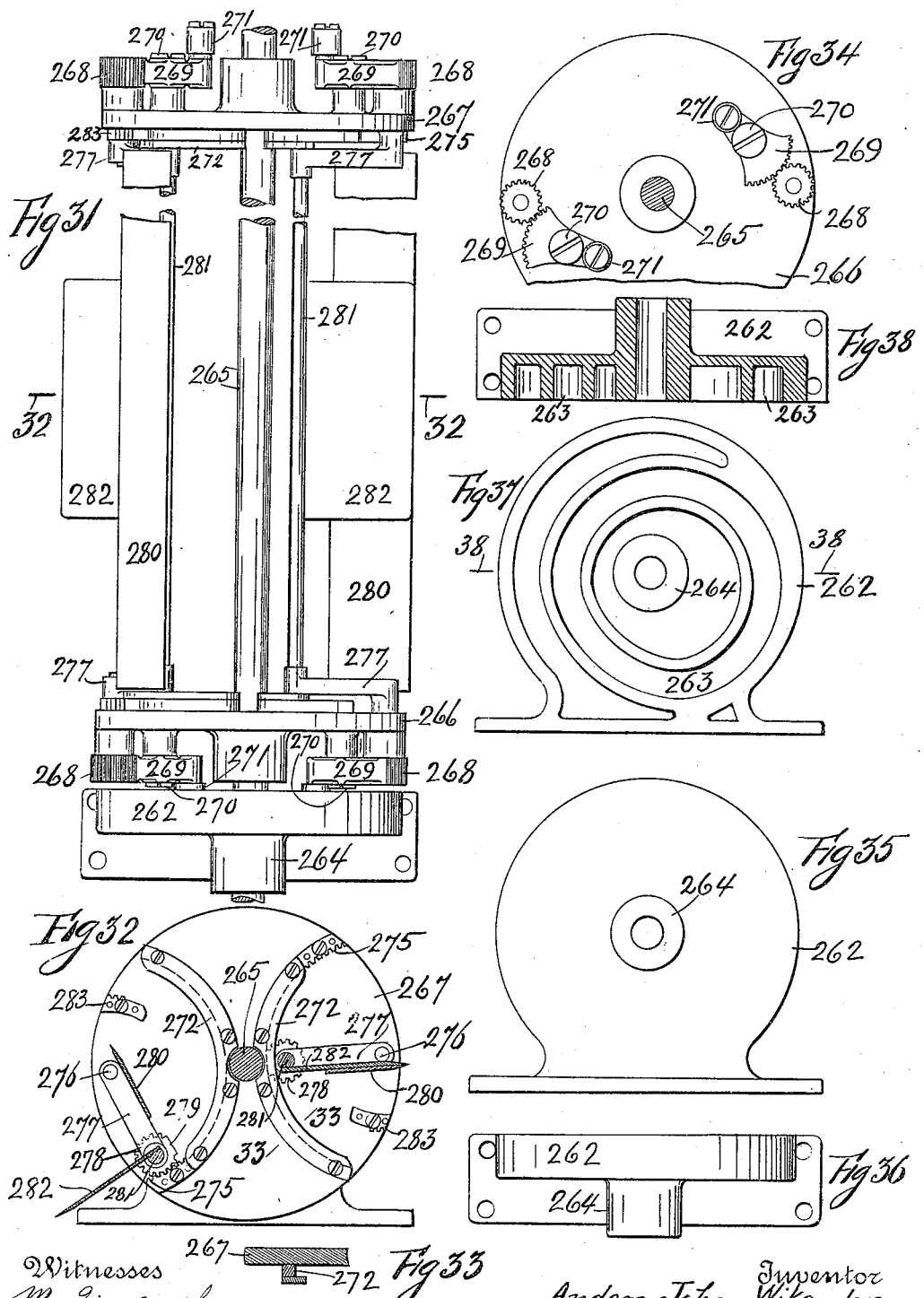

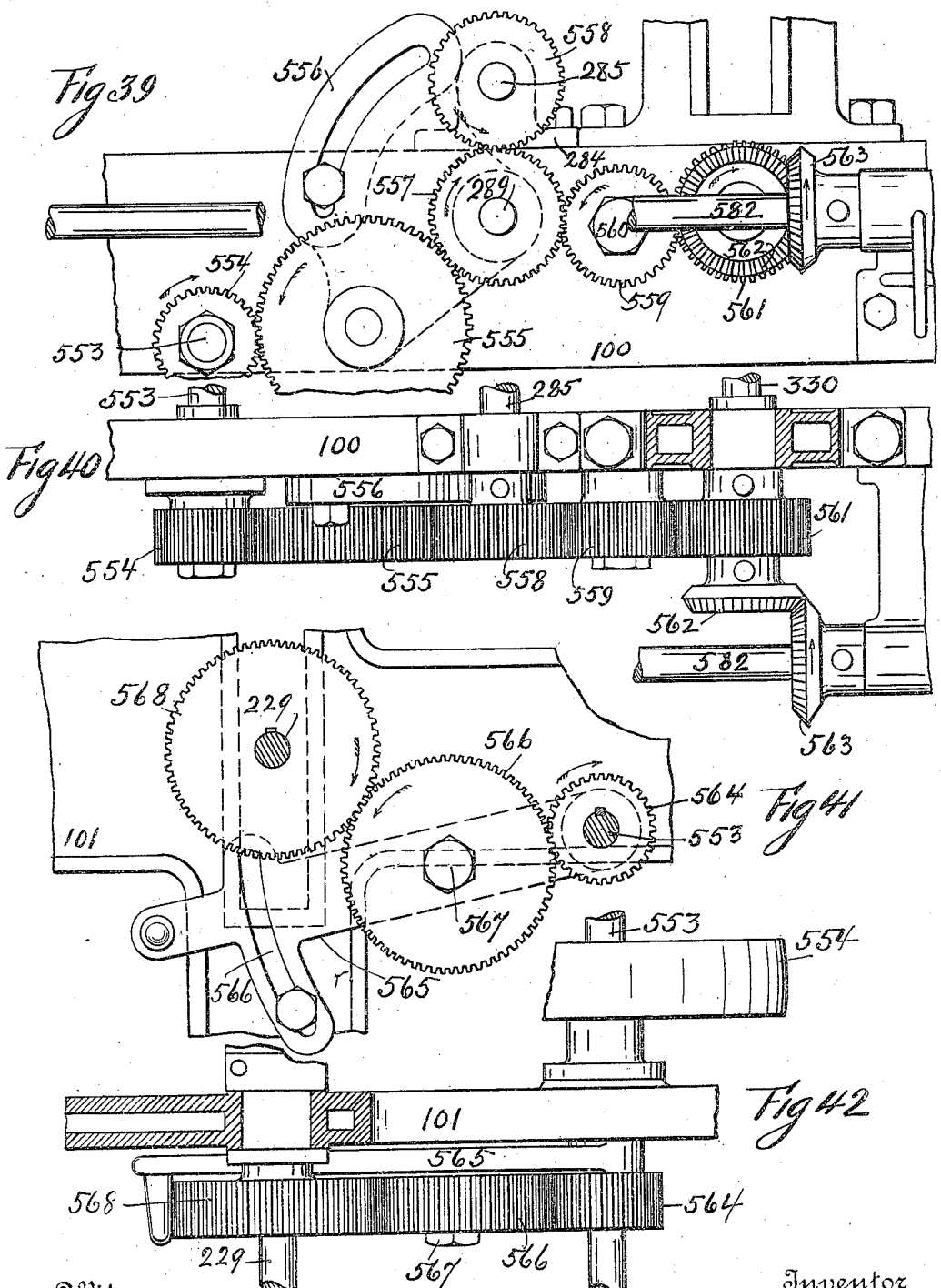

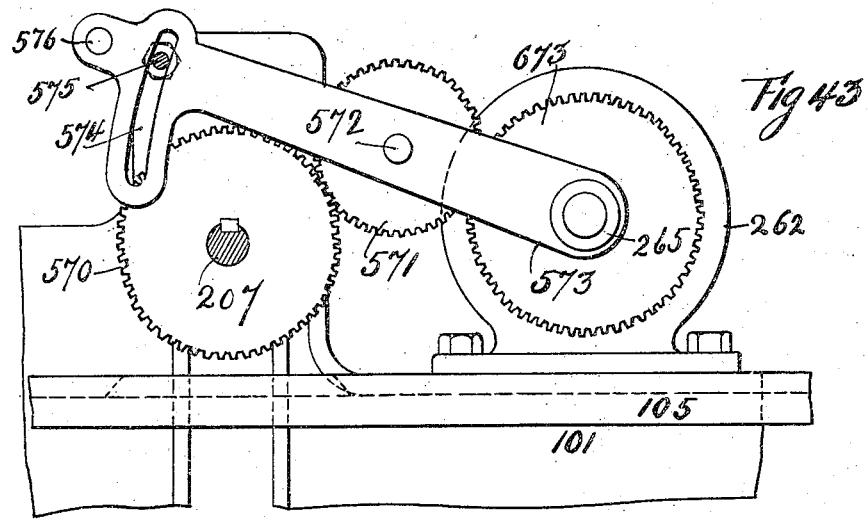
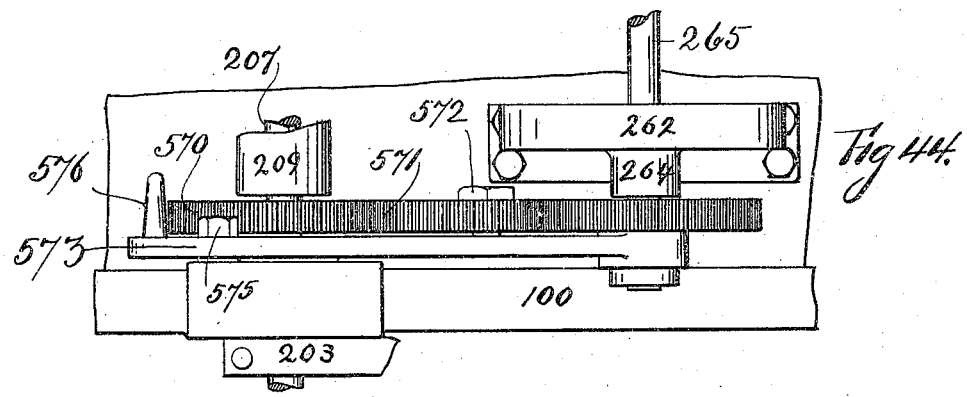
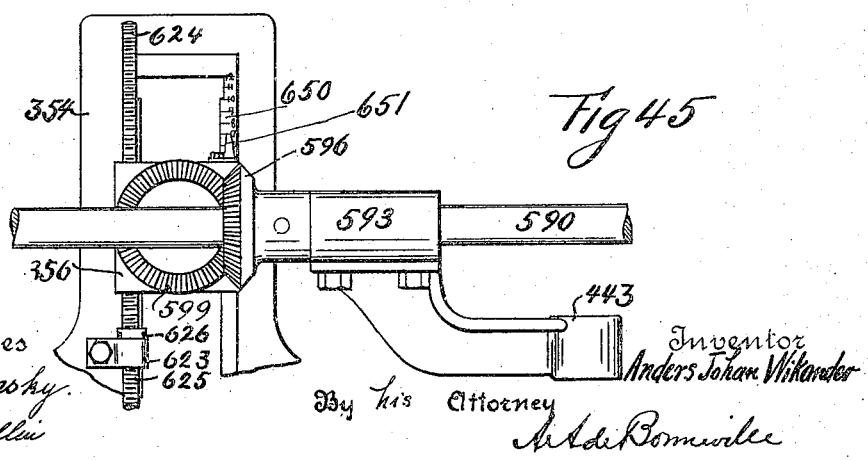

A. J. WIKANDER.
BAG MAKING MACHINE.
APPLICATION FILED FEB. 4, 1907.
945,832.
Patented Jan. 11, 1910.
26 SHEETS—SHEET 17.
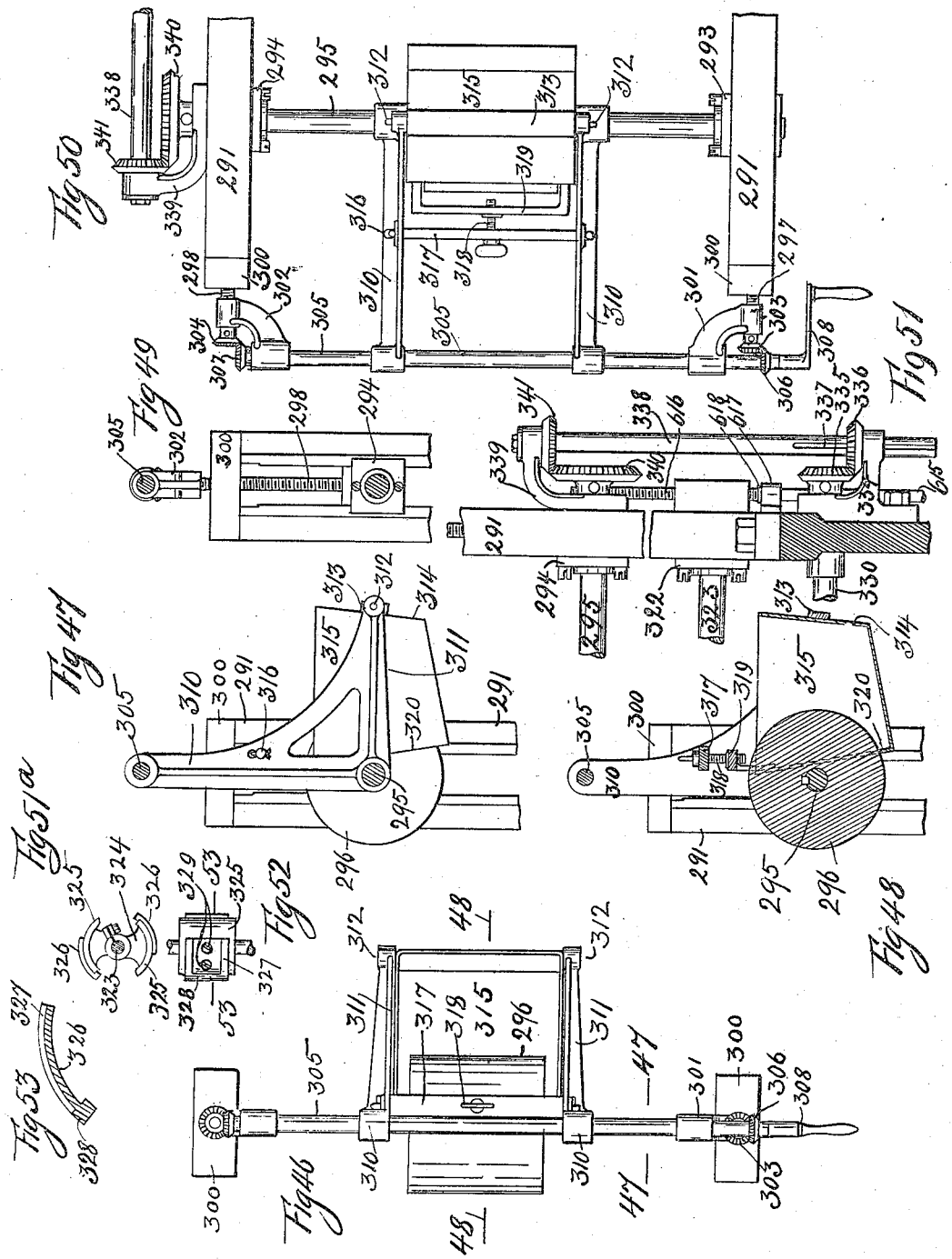
Witnesses
M. Zimansky
John J. Miller
Inventor
Anders Johan Wikander
By his Attorney
A. A. de Bonneville

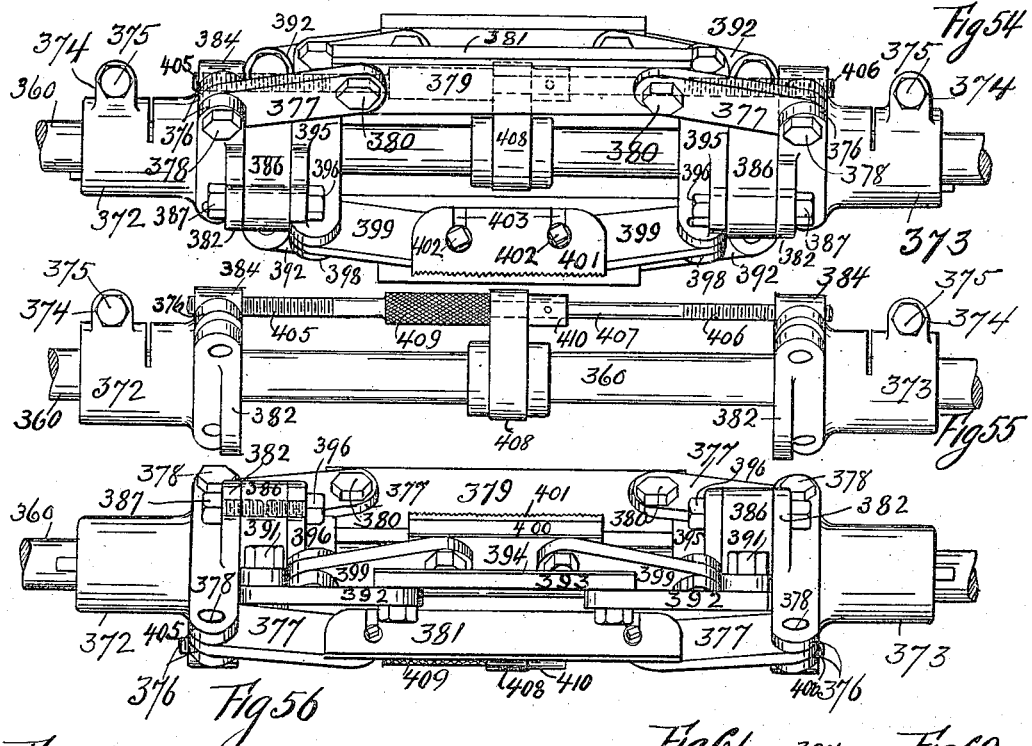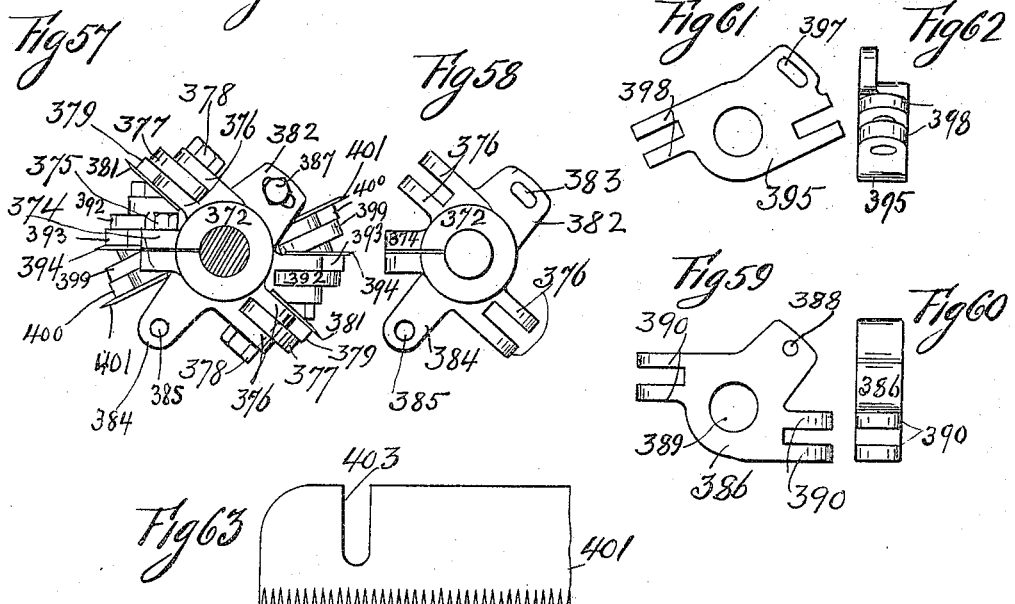

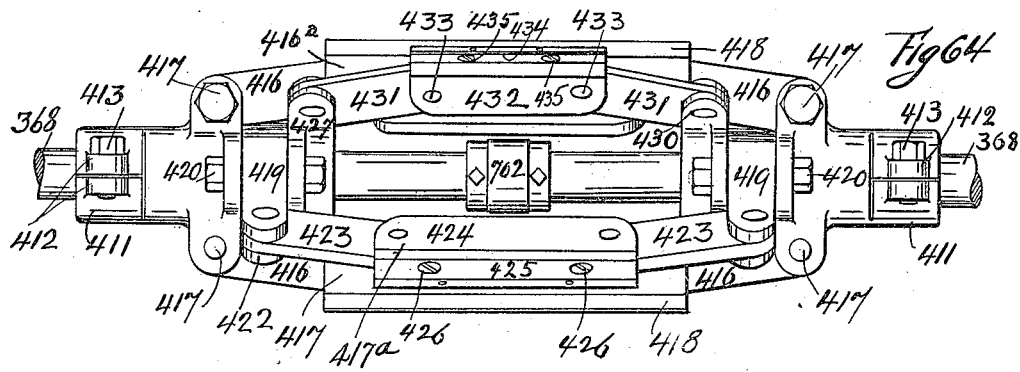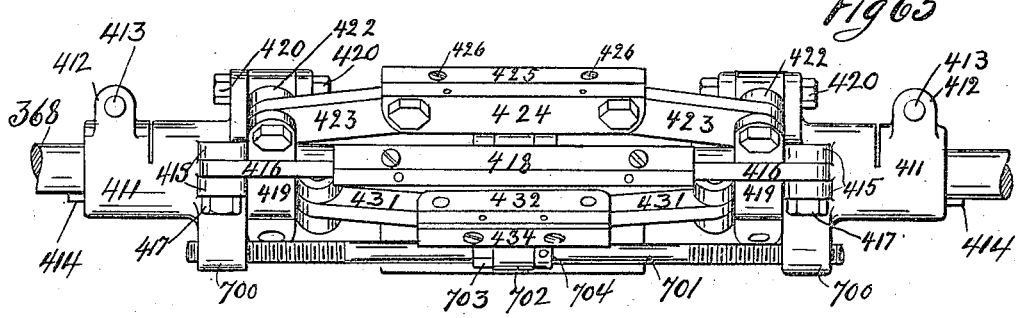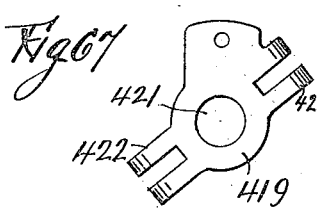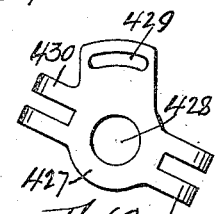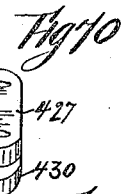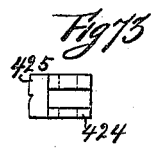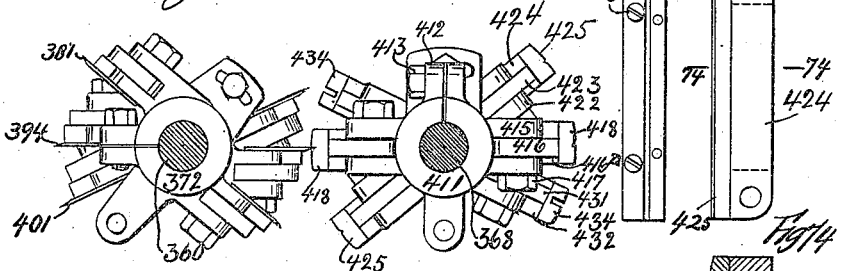

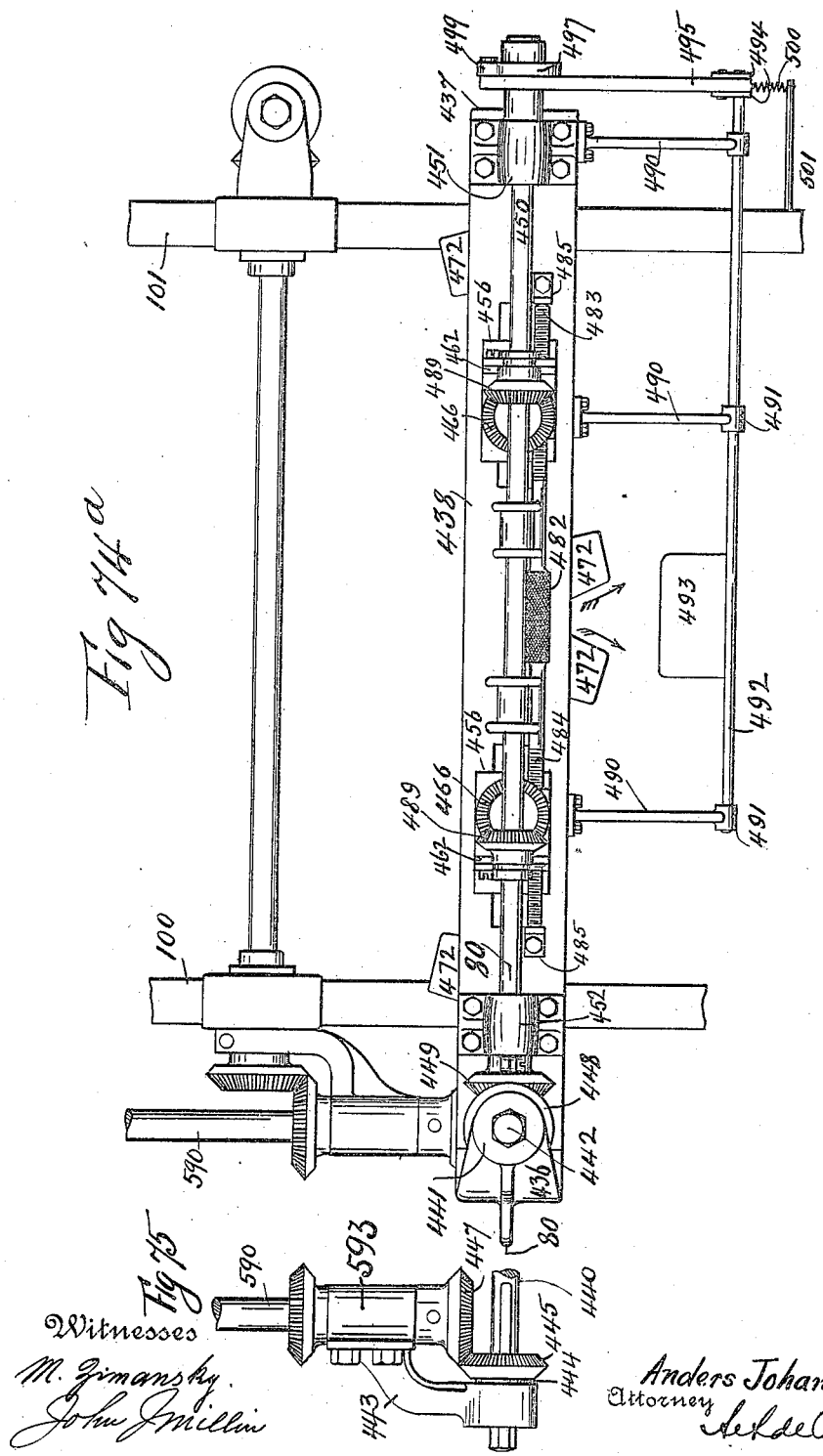

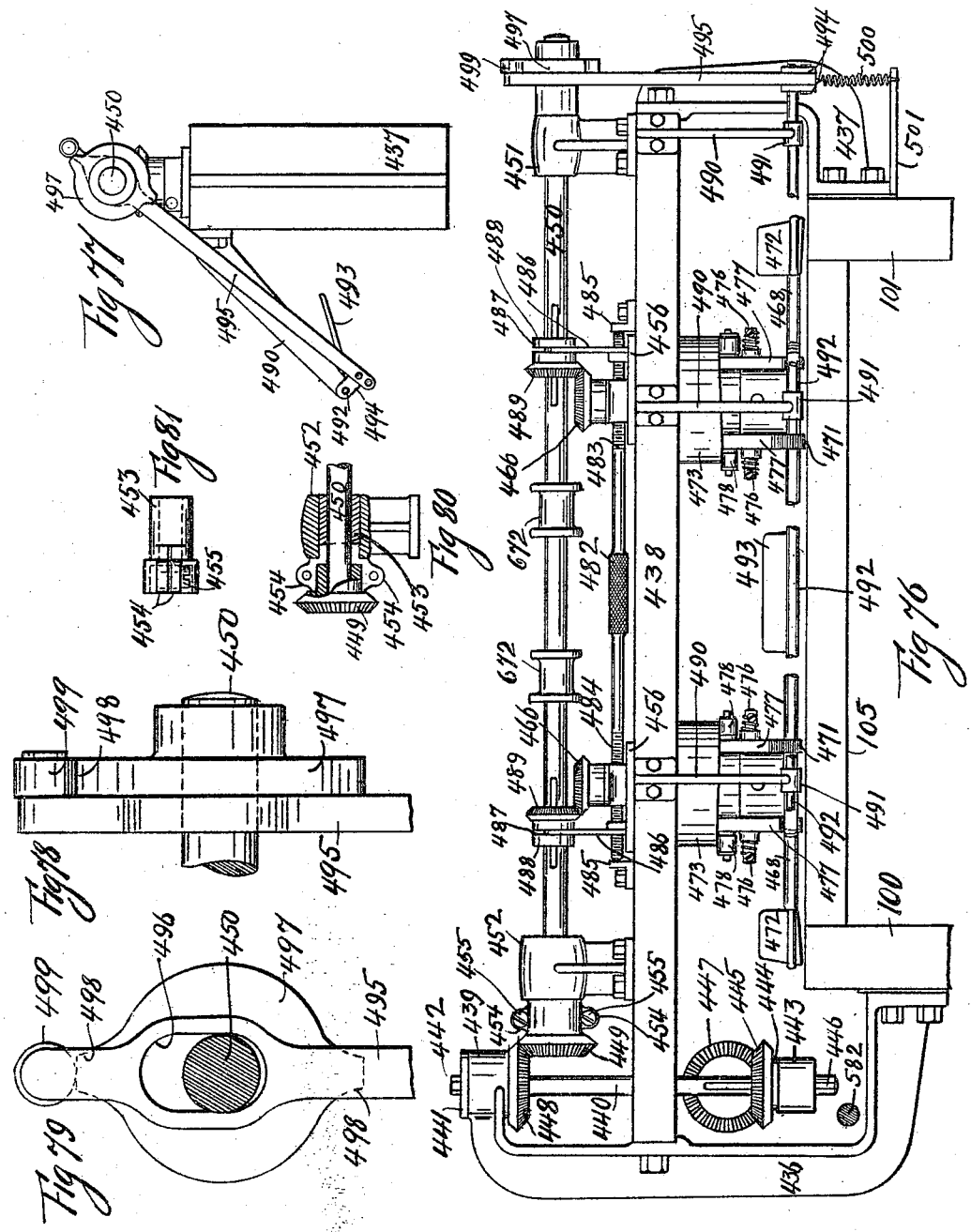

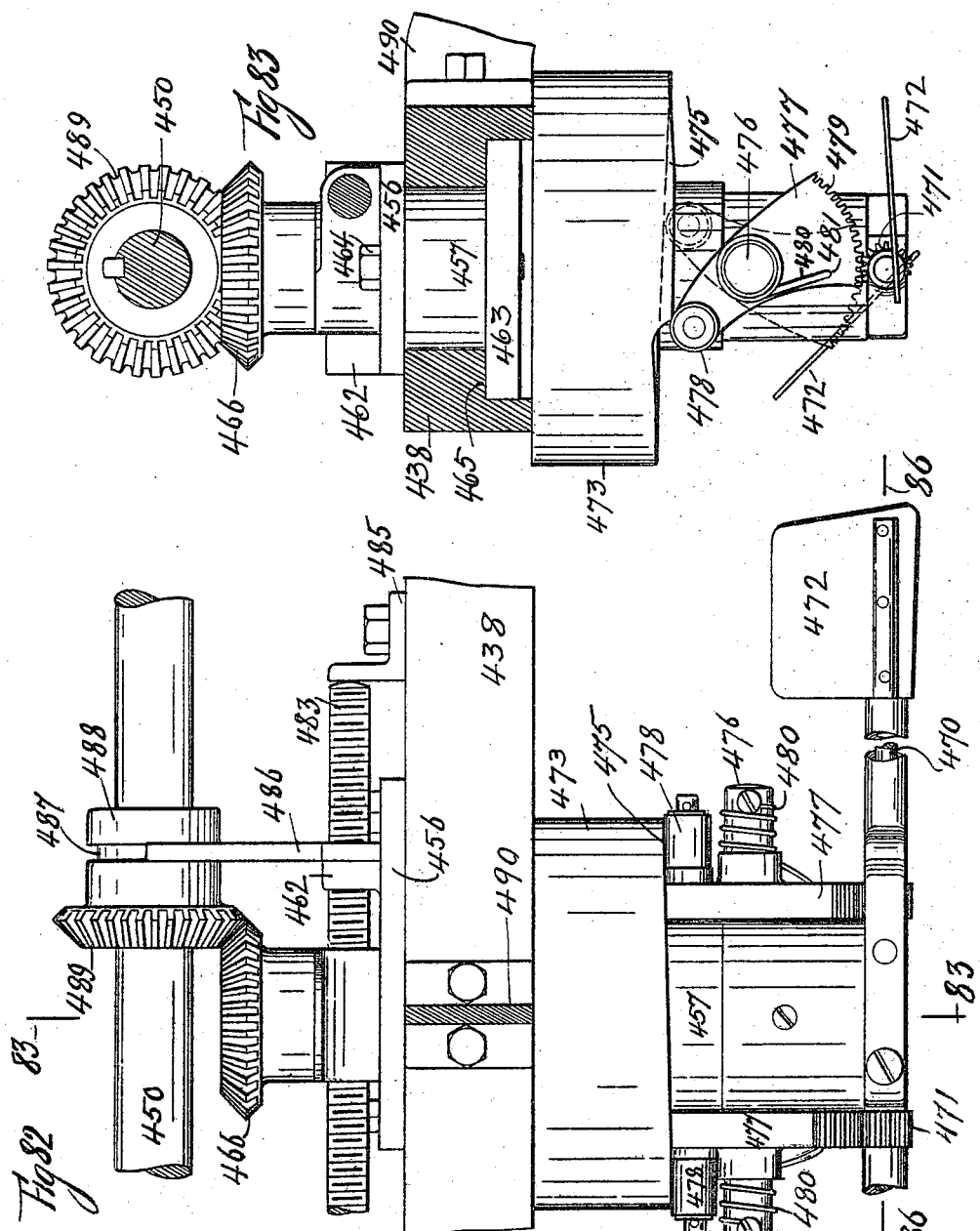

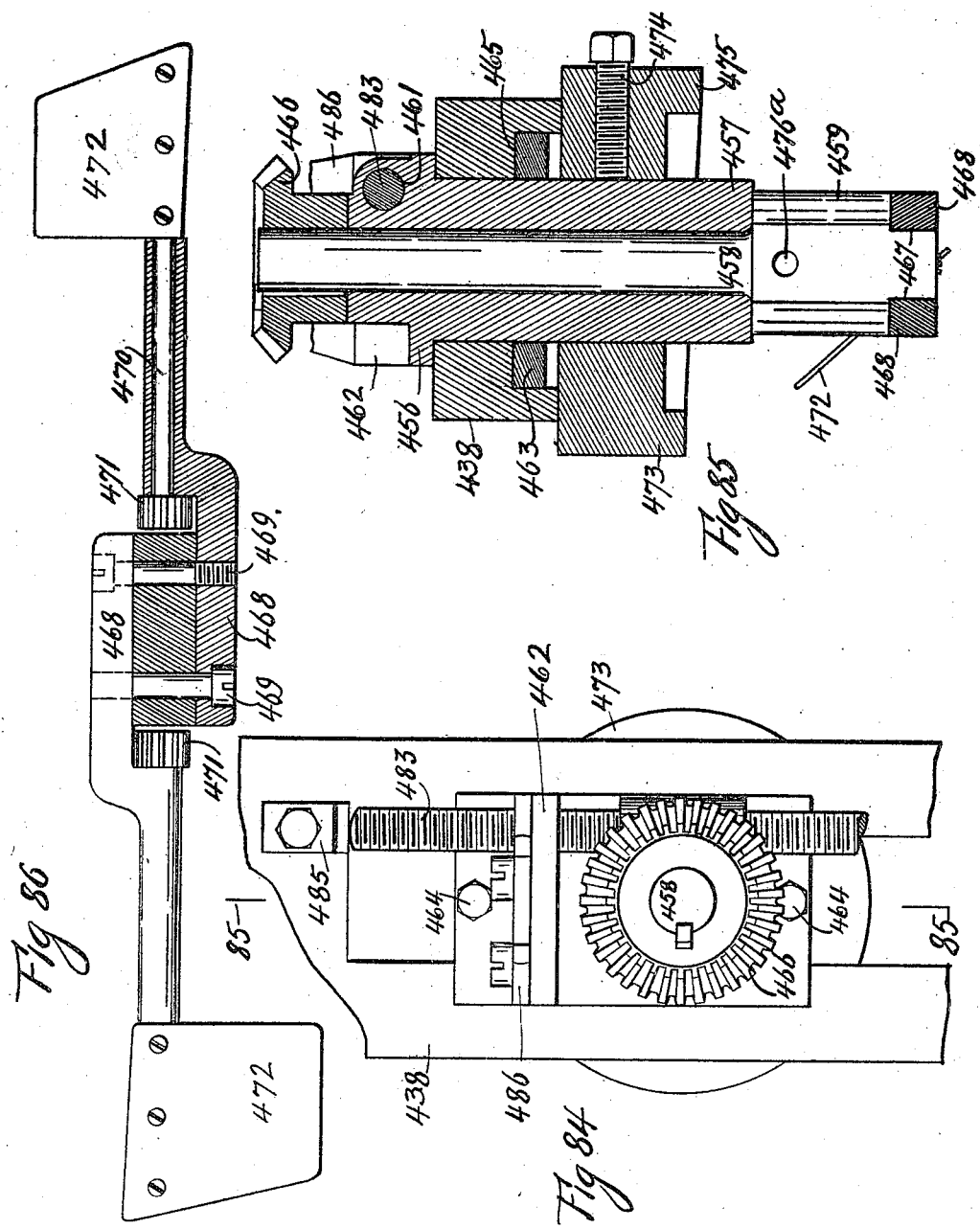

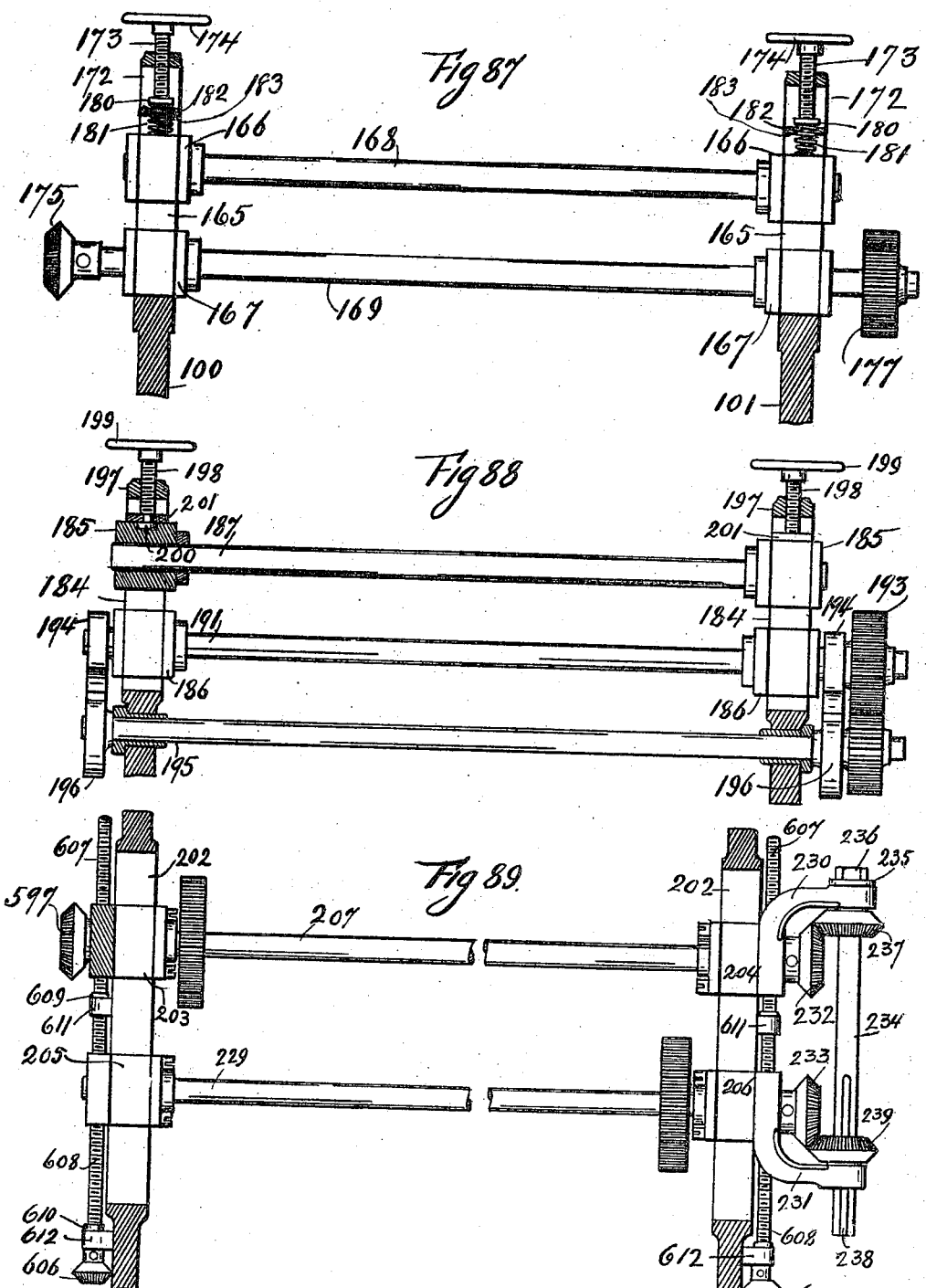

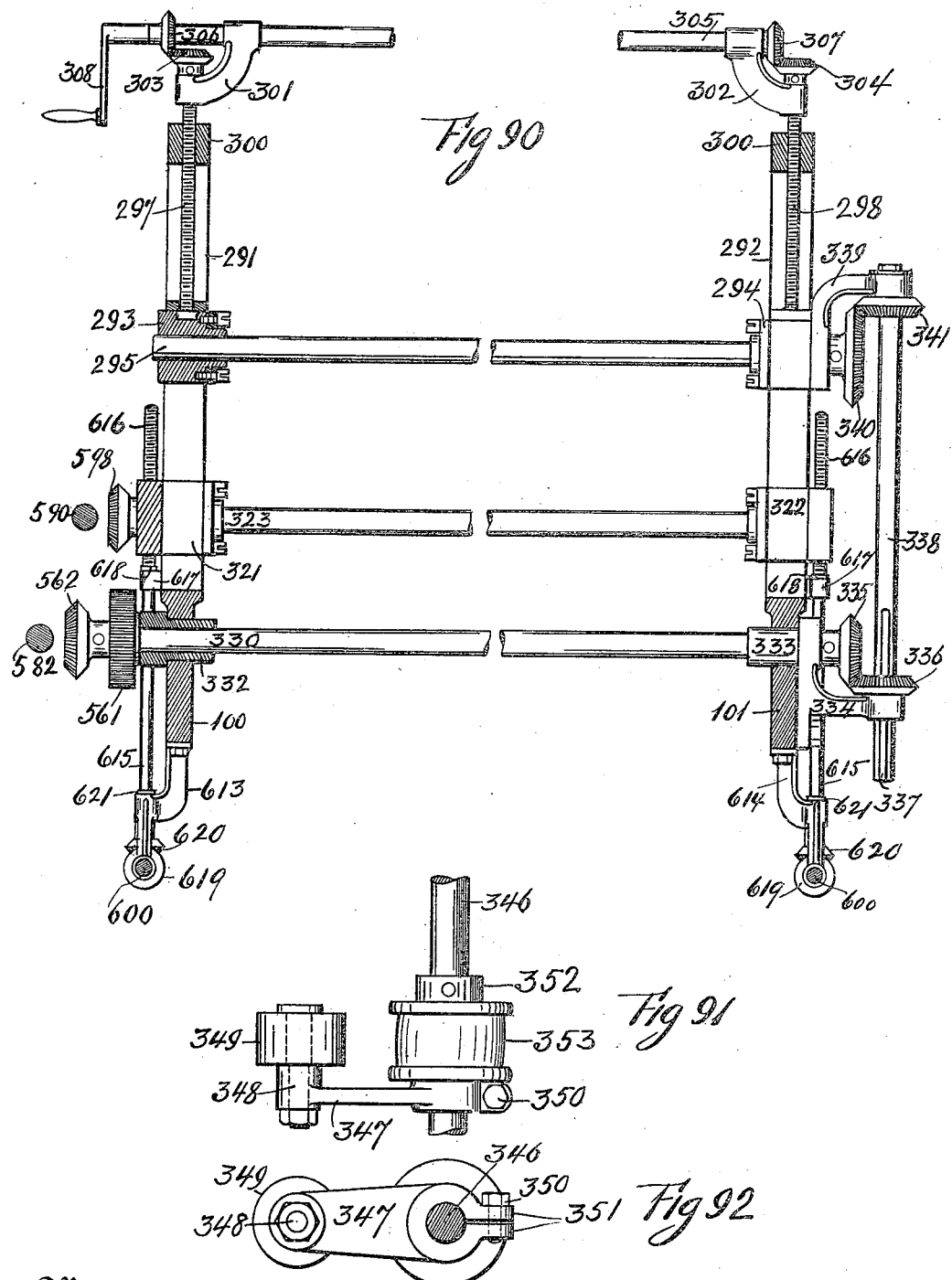

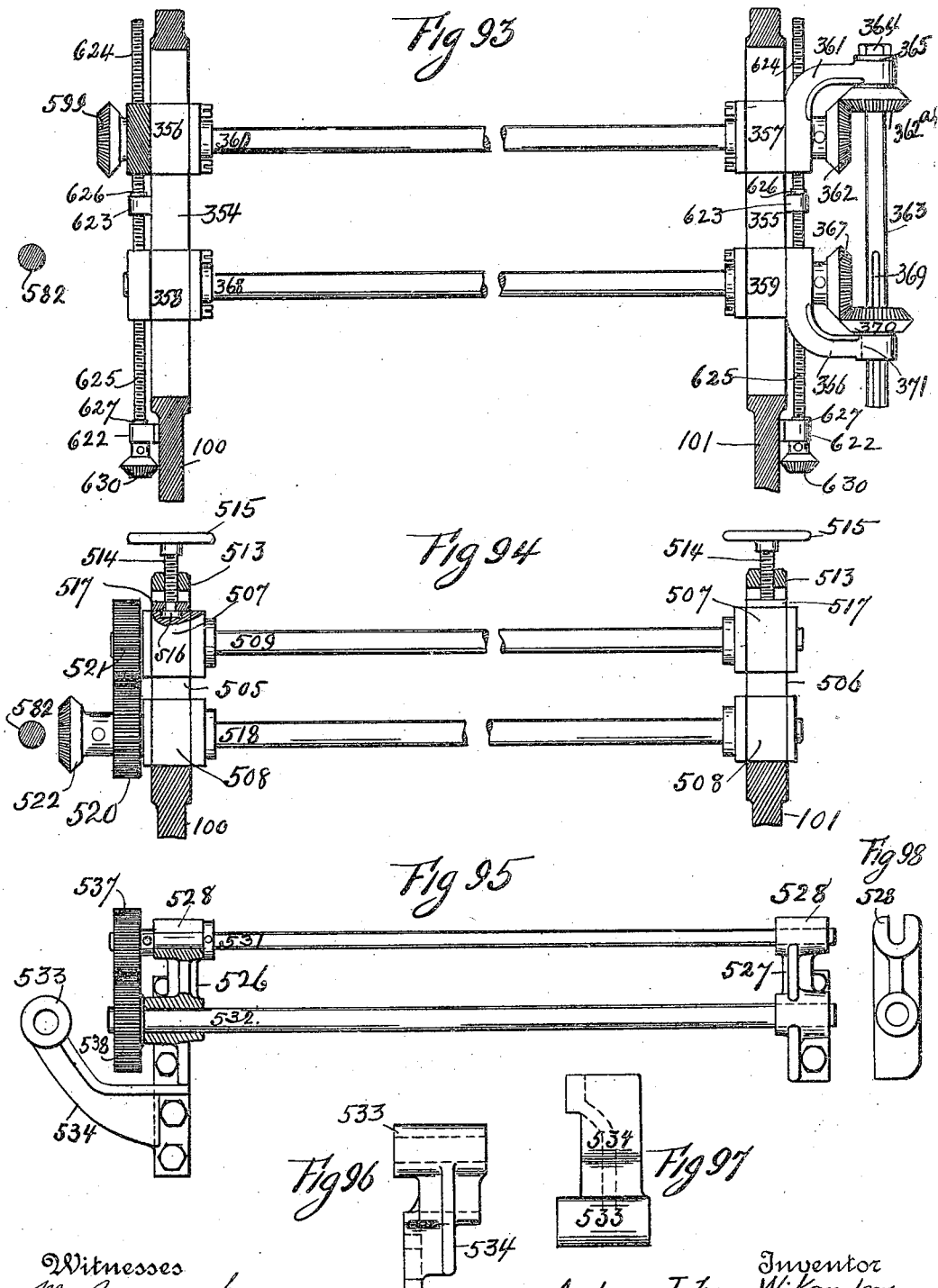

UNITED STATES PATENT OFFICE.

ANDERS JOHAN WIKANDER, OF SOUTH WINDHAM, CONNECTICUT, ASSIGNOR OF ONE-HALF TO AXEL THEODOR JOHNSON, OF BROOKLYN, NEW YORK.

BAG-MAKING MACHINE.

945,832.  Specification of Letters Patent.  Patented Jan. 11, 1910.

Application filed February 4, 1907. Serial No. 355,623.

*To all whom it may concern:*

Be it known that I, ANDERS JOHAN WIKANDER, a citizen of the United States, and a resident of South Windham, in the county of Windham and State of Connecticut, have invented certain new and useful Improvements in Bag-Making Machines, of which the following is a specification.

This invention relates to bag making machines, and its specific object is the production of a satchel bottom bag making machine in which the bags are made from a paper roll by continuous and consecutive series of operations, with high speed.

Figures 1 and 1ª represent a side elevation of a bag making machine embodying the invention, Figs. 2 and 2ª show respectively plan views of Figs. 1 and 1ª, Figs. 3 and 3ª show respectively longitudinal sections of Fig. 2 on the line 3, 3, and of Fig. 2ª on the line 3ª 3ª, Fig. 4 represents an enlarged plan view of a folding blade, Fig. 5 shows a side elevation of Fig. 4, Fig. 6 is an end view of Fig. 4, Fig. 7 represents a section of Fig. 5 on the line 7, 7, Fig. 8 is a plan view showing a portion of Fig. 2, Fig. 9 represents a partial section of Fig. 8 on the line 9, 9, Fig. 10 is a portion of Fig. 9 enlarged, Fig. 11 is a plan view of Fig. 10, Fig. 12 shows a plan view of the bags in different stages of manufacture, Fig. 13 is a plan view of a portion of the lower member of the strip to make the bags, Fig. 14 is a partial section of Fig. 12 on the line 14, 14, Fig. 15 is a view similar to Fig. 1ª with some of the parts omitted, Fig. 16 shows a top plan view of Fig. 15, Fig. 17 represents an enlarged front view of the paper roll, with its supporting frame and appurtenances, Fig. 18 is a top plan view of Fig. 17, Fig. 19 is a lefthand elevation of Fig. 17, Fig. 20 represents a partial longitudinal section of Fig. 18 on the line 20, 20, Fig. 21 shows an enlarged side elevation of the initial pasting roller with its immediate appurtenances, Fig. 22 is a top plan view of Fig. 21, Fig. 23 represents an enlarged plan view of the initial rotary knives, Fig. 24 shows a top view of Fig. 23, Fig. 25 is a lefthand end view of Fig. 23, Fig. 26 represents a section of Fig. 23 on the line 26, 26, Fig. 27 represents an enlarged plan view of the initial guide blocks, Fig. 28 shows a top view of Fig. 27, Fig. 29 is a lefthand view of Fig. 27, Fig. 30 represents a section of Fig. 27 on the line 30, 30, Fig. 31 is an enlarged plan view of the opener and folder with their accompanying appurtenances, Fig. 32 shows a section of Fig. 31 on the line 32, 32, Fig. 33 is a partial section of Fig. 32 on the line 33, 33, Fig. 34 shows an elevation of a disk with its appurtenances, Fig. 35 represents an outside elevation of a grooved cam, Fig. 36 is a top view of Fig. 35, Fig. 37 represents an inside elevation of a grooved cam, Fig. 38 is a section of Fig. 37 on the line 38, 38, Fig. 39 shows an enlarged fragmentary portion of Fig. 1ª, Fig. 40 is a top view of Fig. 39, Fig. 41 shows an enlarged portion of Fig. 3ª, Fig. 42 is a top view of Fig. 41, Fig. 43 shows an enlarged portion of Fig. 1ª, Fig. 44 represents a plan view of Fig. 43, Fig. 45 is an enlarged view of a portion of Fig. 1ª, Fig. 46 represents an enlarged top plan view of the second paste roller and appurtenances, Fig. 47 is a front elevation and section of Fig. 46 on the line 47, 47, Fig. 48 shows a section of Fig. 46 on the line 48, 48, Fig. 49 represents an enlarged front view of one of the guides for the second paste roller, Fig. 50 is an enlarged side view of Fig. 46, Fig. 51 is an enlarged partial view of the lower portion of one of the guides shown in Fig. 50 with its appurtenances, Fig. 51ª shows an elevation of a paste sector, Fig. 52 is a top view of Fig. 51ª, Fig. 53 is a partial section of Fig. 52 on the line 53, 53, Fig. 54 is an enlarged plan view of the cutting off knives and creasing blades with their appurtenances, Fig. 55 is a view similar to Fig. 54 with some of the parts omitted, Fig. 56 shows a bottom view of Fig. 54, Fig. 57 is a lefthand end view of Fig. 54, Fig. 58 shows a portion of Fig. 57, Fig. 59 is a portion of Fig. 54, Fig. 60 shows an end view of Fig. 59, Fig. 61 is a portion of Fig. 54, Fig. 62 shows an end view of Fig. 61, Fig. 63 represents a further enlarged fragmentary portion of the cutting off knife, Fig. 64 represents an enlarged plan view of the guide blocks for the cutting off knife and creaser blades, Fig. 65 shows a bottom view of Fig. 64, Fig. 66 shows an end view of Fig. 64 with an end view of the cutting off knives and creaser blades, Fig. 67 is a portion of Fig. 66, Fig. 68 shows an end view of Fig. 67, Fig. 69 also represents a portion of Fig. 66, Fig. 70 shows an end view of Fig. 69, Fig. 71 represents a plan view of one of the creasing guide blocks, Fig. 72 is a side view of Fig. 71, Fig. 73 shows a top view of Fig. 72, Fig. 74 is a section of Fig. 72 on the line 74, 74, Fig. 74ª represents an enlarged top plan view of the folders with their appurtenances at the delivery end of the machine, Fig. 75 is a partial side view of Fig. 74ª, Fig. 76 shows an elevation of Fig. 74, Fig. 77 is a partial right hand side view of Fig. 76, Fig. 78 shows an enlarged view of a detail of Fig. 76, Fig. 79 is a side view of Fig. 78, Fig. 80 represents a partial section of Fig. 74 on the line 80, 80, Fig. 81 shows a top view of a portion of Fig. 80, Fig. 82 is an enlarged fragmentary portion of Fig. 76, Fig. 83 is a side view and partial section of Fig. 82 on the line 83, 83, Fig. 84 shows a partial top plan view of Fig. 82, Fig. 85 represents a partial section as on the line 85, 85 of Fig. 84, Fig. 86 shows a plan view of a pair of the finishing folders and partial section as on the line 86, 86 of Fig. 82, Fig. 87 represents a partial section of Fig. 2ª on the line 87, 87, Fig. 88 is a partial section of Fig. 2ª on the line 88, 88, Fig. 89 shows a partial section of Fig. 2ª on the line 89, 89, Fig. 90 represents a partial section of Fig. 2ª on the line 90, 90, Fig. 91 represents enlarged plan view of an idler pulley with its appurtenances, Fig. 92 is an elevation of Fig. 91, Fig. 93 shows a partial section of Fig. 2ª on the line 93, 93, Fig. 94 represents a partial section of Fig. 2ª on the line 94, 94, Fig. 95 is a partial section of Fig. 2ª on the line 95, 95, Fig. 96 shows a partial righthand side view of Fig. 95, Fig. 97 is a top view of Fig. 96, and Fig. 98 is a partial left hand side view of Fig. 95.

In the accompanying drawings, a paper bag making machine is shown to exemplify the invention, and in the following description the parts thereof will be considered, as closely as possible, in the order that they come into play in making a bag.

The invention comprises a pair of side frames 100 and 101, with the connecting cross frames 102, 103 and 104, and a platform or table 105 with suitable openings to provide clearances for the operations of the various mechanisms contained in the machine. Adjacent to the said frames are located the means for supporting the paper roll 106, and its appurtenances.

The paper roll 106 with its adjoining parts, (the details of which with its appurtenances are shown in Figs. 17 to 20,) comprises the bed plate 107, from which extend a pair of guide columns 108, with long vertical guides 109. In the latter are guided the cross-heads 110, that support the mandrel 111 having a collar 112.

From one of the guide columns 108 extends the bracket 113 that constitutes a bearing for journal pin 114 and on which is supported the spur gear 115, to which latter is fastened the handle 116. In the bed plate 107 is formed a long opening 117, which constitutes a guide for two crossheads 118, that are threaded for the screw 119 having a right handed thread on one end and a left handed thread on the other. One end of the screw 119 carries the pinion 120 which meshes with the gear 115. On each of the cross heads 118 is journaled a horizontal roller 121, on the screw pin 122. On the upper face of the bed plate 107 are fastened journal brackets 123, in which are journaled the paper roll supporting rollers 124. An inclined platform 125 is located adjacent to the bed plate 107.

From the side frames 100 and 101 extend the brackets 129 and 130 (for details see Figs. 21, 22). To the latter is attached a journal bracket 131, in which is pivoted the bent arm 132 that carries the clamp 133 with the clamping screw 134. The clamp 133 supports the paste box 135, on which is supported the frame 136, with the journal bearings 137, the opening 138 and an opening 139. An initial pasting roller 140 has the arbor 141 which is supported in the bearings 137. The opening 139 just allows the said pasting roller to pass therethrough, and the opening 138 is somewhat larger. A spring 142 is wound around the arm 132, and tends to bring the initial pasting roller 140 against the strip of paper that is traveling around the roller 143, the latter being journaled in the ends of the brackets 129 and 130.

A supporting rod 150 (see Figs. 1 to 11) extends between the brackets 129 and 130, to which are clamped the arms 151 that hold the convexed shoes 152. To the rod 150 is also fastened the guide 153, which is curved to meet the horizontal plane of the table 105, and its end terminates in two prongs 154 and 155. On the table 105 and on each side of the guide 153 are adjustably clamped the similar folding wings 156, one of which is clamped a little ahead of the other. Each of said folding wings has a lug 157 with an opening 158, with which a bolt 159 secures it in proper position to the table 105. Each folding wing 156 at its entering end for the paper is turned up as shown at 160. Each of the frames 100 and 101 has a lug 164 extending up therefrom in which are formed guides (for detail see Fig. 87) 165 that hold crossheads 166 and 167, which support respectively the cross shafts 168 and 169 and the latter respectively carry the draw rollers 170 and 171. The guides 165 are capped with the brackets 172, which are threaded for the screws 173 having the hand wheels 174 and the collars 180. Below the collars 180 are placed springs 181 which bear on the cross-heads 166, suitable openings 182 being formed in the feet 183 of the brackets 172. On the end of the shaft 169 is fastened the bevel gear 175 that meshes and is driven by the bevel gear 176, and to the other end of the shaft 169 is fastened the gear 177. A pin 178 extends from the frame 101 on which is journaled the gear 179 that meshes with the gear 177. In each of the lugs 164 are also formed guides 184 (for details see Fig. 88) for the cross-heads 185 and 186. In the cross-heads 185 are journaled the ends of the shaft 187 which latter carries the crimping rolls 188. The said crimping rolls are formed with the flutes 189, and a cylindrical surface 190 smaller in diameter than the fluted surface is formed in the central portion of the rolls.

In the cross-heads 186 is journaled the shaft 191 which carries crimping rolls 192 similar to the crimping rolls 188, and of which the flutes straddle the flutes 189 of the rolls 188. On one end of the shaft 191 is fastened the gear 193 which meshes with the gear 179, and on each end of said shaft 191 is fastened a roller 194. Below the shaft 191 is journaled a cam shaft 195, on each end of which is fastened a cam wheel 196 that engages with the roller 194 and on one end carries a gear 707, which meshes with gear 193. On top of the guides 184 are secured the caps 197 which are threaded for the screws 198 with the hand wheels 199 and the collars 200. The collars 200 engage in cavities in the top ends of the cross-heads 185, and plates 201 maintain the collars 200 in place. In the frames 100 and 101 are formed guides 202 (for details see Figs. 89 and 23 to 26) for the cross-heads 203, 204, 205 and 206. In the cross heads 203 and 204 is journaled the cross shaft 207 with the splines 208, and toggle hubs 209 to which latter are pivoted the toggles 210. The toggles are pinned to the knife holders 211 by means of the pins 212. The knife holders are curved in their central portion 213, and carry the knives 214 which are secured to them by the screws 215. Brackets 216 are clamped about the knife holders 211 and knives 214, by the screws 217. To the brackets 216 are fastened the longitudinal cutting knives 218. The latter knives each have slots 219, through which pass the screws 220 that enter the brackets 216. A stop collar 221 is fastened to the shaft 207 and is bored for the operating shaft 222, that has formed thereon the handle 223, which abuts against the stop collar 221, and the operating shaft has a collar 224 which also abuts against said stop collar 221. The operating shaft 222 has at one end a right handed screw 225 which engages with a threaded lug 226 of the toggle hub 209, and a left handed screw 227 which engages with a threaded lug 228 of the other toggle hub 209.

In the cross heads 205 and 206 is journaled a guide block cross shaft 229. The cross-head 204 has extending therefrom the bracket 230, and the cross-head 206 has a similar bracket 231. A bevel gear 232 is fastened to the shaft 207, and a bevel gear 233 is fastened to the cross shaft 229. A vertical shaft 234 with a collar 235 and screw 236 extends from the bracket 230 down to and through the bracket 231. A bevel gear 237 is fastened to the vertical shaft 234 and meshes with the bevel gear 232. A spline 238 on the shaft 234 holds a bevel gear 239 also on said vertical shaft 234, the latter gear meshing with the bevel gear 233 on the shaft 229.

On the shaft 229 (see details Figs. 27 to 30) are located the sliding toggle hubs 240 and 241. The hub 240 has extending therefrom the jaws 242 which are engaged by bolts 243, by means of which lost motion between the hub and shaft 299 can be taken up. Jaws 244 extend from the hub 240 for the toggles 245, pins 246 joining the toggles 245 with the jaws 244. A spline 247 extends from the shaft 229 and engages with the hub 240. The toggle hub 241 is similar to the hub 240, and has pivoted therefrom the toggles 248. A spline 249 extends from the shaft 229 which engages with the hub 241. U-shaped holders 250 are pinned to the toggles by the pins 251 and 252. On the holders 250 are supported the curved guide blocks 253, each of which has a depression 254. On the shaft 229 is fastened the stop collar 255, which supports the operating shaft 256. The latter has a corrugated enlargement 257 that abuts against the collar 255, and a collar 258 on the shaft 256 bears against the other side of the collar 255. On the ends of the shaft 256 is formed the right handed screw 258 which engages with a threaded lug 259 of the toggle hub 240. The said shaft 256 at the other end terminates in the left handed screw 260 which engages with the lug 261 extending from the toggle hub 241.

On the table 105 are secured the housings 262 (for details see Figs. 31 to 36) with each of which are formed grooved cams 263, and hubs 264. The hubs 264 support the shaft 265 which carries the similar disks 266 and 267. On the outer face of each of said disks are journaled pinions 268 each one of which meshes with a sector 269, and each of the latter is fulcrumed on a pin 270. A roller 271 is journaled on each sector 269, which roller engages with the groove 263. On the inner faces of each of the disks 266 and 267 are secured the circular guides 272 from which extend the toothed segments 275. On pins 276 extending from the inner faces of the disks 266 and 267 are pivoted the links 277, in the ends of which are journaled the fragmentary gears 278, the teeth of which can mesh with the sectors 275. A portion of the circumferential surface of each of the gears 278 have their teeth cut away as shown at 279, to form a smooth curved edge which will conform to the surface of the guides 272, and will engage therewith when in proper position. Each link 277 on one disk is connected with its corresponding link on the other disk, by the folding blade 280. To the swinging ends of each pair of accompanying links 277 there is journaled a shaft 281 on which is fastened a combined opening and folding blade 282. On the inner face of each of the disks 266 and 267 are also secured the fragmentary sectors 283.

A pair of pillow blocks 284 (see general views) support a shaft 285 which carries a folding roller 286. The roller 286 between its central portion and ends 287 is reduced in diameter as shown at 288, which latter form bearing surfaces to be explained. A shaft 289 is journaled in the frames 100 and 101 vertically below the shaft 285 and carries a folding roller 290 similar to the roller 286.

Guide brackets 291 and 292 (for details see Fig. 90) extend up from the frames 100 and 101 and guide the cross-heads 293 and 294, which support a shaft 295 that carries the second paste wheel 296. From the cross-head 293 extends the vertical screw 297, and from the cross-head 294 extends the vertical screw 298. Each of the latter screws passes through a threaded cap 300. At the top of the screw 297 is located a bracket 301, and at the top of the screw 298 there is located a bracket 302. The screw 297 carries a bevel gear 303, and the screw 298 carries the bevel gear 304. A cross-shaft 305 is journaled in bearings of the brackets 301 and 302. On the ends of the shaft 305 are fastened the bevel gears 306 and 307, that mesh with the bevel gears 303 and 304 respectively, and a crank handle 308 extends from the shaft 305. Brackets 310 (see Figs. 46 to 53 for details) extend from the shaft 305, and they each have a horizontal leg 311, at the ends of which are supported the pins 312 of the cross-plate 313. To the latter plate is fastened a wall 314 of the paste box 315. Through the vertical legs of the brackets 310 extend the pins 316 of the cross-bar 317, which latter is threaded for a screw 318 that connects with a bracket 319, extending from the wall 320 of the paste box 315.

Below the cross-heads 293 and 294 there are located in the guides 291 and 292, the cross-heads 321 and 322 in which is journaled the shaft 323. The shaft 323 carries the paste sector that comprises the spider 324 with the curved bearing plates 325, that support the spreaders 326, having the longitudinal projections 327 and cross-projections 328. The spreaders are secured by screws 329 to the plates 325.

Below the shaft 323 is journaled in the frames 100 and 101 shaft 330 to which is fastened the supporting roller 331. In the frames 100 and 101 are supported journal bearings 332 and 333, and the latter passes through the bracket 334. A bevel gear 335 is fastened to the shaft 330, which meshes with a bevel gear 336, that is supported on a spline 337 of the vertical shaft 338. From the cross-head 294 extends the bracket 339, through which passes the shaft 295, and a bevel gear 340 on the end of the shaft 295 meshes with the bevel pinion 341 secured to the vertical shaft 338.

On the top of the caps 300 (see general views) of the guides 291 and 292 are bolted the journal brackets 345 which support the shaft 346, from which extend the hangers 347 that carry pins 348 for the idlers 349. The hangers can be clamped in various positions on the shaft 346, by means of the screws 350 clamping the jaws 351 thereof. Collars 352 are secured to the shaft 346 adjacent to the belt rollers 353. From the frames 100 and 101 extend the guides 354 and 355 (for details see Fig. 93) in which are located the upper cross-heads 356 and 357, and the lower cross-heads 358 and 359.

In the cross-heads 356 and 357 is journaled the shaft 360. From the cross-head 357 extends the journal bracket 361, through which the shaft 360 passes, the latter carrying the bevel gear 362. A vertical shaft 363 is journaled in the bracket 361, and a screw 364 with a washer 365 holds the shaft 363 in place.

A journal bracket 366 extends from the cross-head 359 and a bevel gear 367 is fastened on the shaft 368 that is journaled in the cross-heads 358 and 359. The vertical shaft 363 carries a spline 369 which engages with a bevel gear 370, the boss 371 of the bevel gear being journaled in the bracket 366.

On the shaft 360 (see Figs. 54 to Fig. 63 for details) are located the movable toggle hubs 372 and 373 with each of which are formed the clamping jaws 374 that are connected by the bolts 375. Lugs 376 extend from the hubs 372 and 373, to which are pinned the toggle links 377 by means of the pins 378. The links 377 are joined by the creasing blade holders 379 by means of the pins 380, and on which are fastened the creasing blades 381.

From the toggle hubs 372 and 373 extend also the lugs 382 each with an elongated opening 383, and the lugs 384 each with a threaded opening 385. To each lug 382 is adjustably secured the lug bracket 386 by means of a bolt 387, which engages a threaded hole 388 in the lug bracket 386 and the opening 383 in the lug 382. The bracket 386 has an opening 389 for the shaft 360. Lugs 390 extend from the bracket 386, and they support pins 391 on which latter are pivoted the toggle links 392, and to the latter are pinned the holders 393 for the creasing blades 394. Next to the bracket 386 is adjustably bolted the bracket 395, a screw 396 passing through the opening 397 and then in a threaded opening in the bracket 386. Journal lugs 398 extend from the bracket 395, and in which are pinned toggle links 399 that are joined by the knife holders 400. To the latter are bolted the knife blades 401 by means of screws 402 passing through slots 403 in the said knife blades 401. In the threaded holes 385 of the toggle hubs 372 and 373 are supported the right handed threads 405, and left handed threads 406 of the operating shaft 407, which latter is supported in the stop lug 408. A corrugated raised portion 409 bears against the lug 408, and a collar 410 on the shaft 407 also bears against the lug 408.

On the shaft 368 (for details see Figs. 64 to 74) are adjustably secured the toggle hubs 411 which have the clamping jaws 412, that are held together by means of the screws 413. Splines 414 on the shaft 368 engage with the hubs 411. Lugs 415 extend from the hubs 411, and in which are pinned the toggle links 416 by means of the pins 417. The links 416 are pinned with the holders 416$^a$ and 417$^a$ the latter carrying the guide blocks 418. To the toggle hubs 411 are bolted the brackets 419, by means of screws 420. The brackets 419 have openings 421 through which the shaft 368 passes, and also have the lugs 422 in which are pinned the toggle links 423, the latter being pinned to the holders 424 with the guide 425, the latter being held by the screws 426. Brackets 427 have openings 428 with which they are supported on the shaft 368, and through openings 429 the brackets 427 are secured by means of the bolts 420 to the hubs 411. The brackets 427 have the journal lugs 430 in which latter are pinned the toggle links 431. Holders 432 are pinned to the links 431 by the pins 433, and guide blocks 434 are secured on the holders 432 by means of screws 435. Lugs 700 extend from the toggle hubs 411, and they are threaded for the right handed and left handed threads of the operating shaft 701. The latter is journaled in the stop collar 702 carried on the shaft 368. A hexagonal projection 703 extends from the operating shaft 701 which abuts against the stop collar 702, and a collar 704 on the latter shaft bears against the opposite side of said stop collar.

To the side frames 100 and 101 are respectively bolted the brackets 436 and 437 (for details see Figs. 76 to 86,) which are joined above the table 105 of the machine by the connecting brace 438. In the bracket 436 is formed a bearing 439 for the vertical spindle 440, on the top of which is supported the plate 441, and a screw 442 screwed into the top end of the spindle 440 holds the latter in place. To the journal bracket 593 is bolted the journal bracket 443 which constitutes a bearing for a sleeve 444, extending from the bevel gear 445, which latter can slide on the spindle 440 and is engaged therewith by means of the spline 446. A bevel gear 447 on an adjustable side shaft 590 to be described meshes with the bevel gear 445. At the top of the spindle 440 is fastened the bevel gear 448 which meshes with a bevel gear 449, that rotates with the cross-shaft 450. The latter shaft is supported in the journal bearing 451 and the bearing 452. In the latter a split bushing 453 has the jaws 454, clamped by the bolts 455, and the said bushing is tightened on the boss of the bevel wheel 449 and on the shaft 450. Supported in the cross-brace 438 are located the similar slides 456 with their appurtenances, which will now be described. Each slide 456 has extending therefrom the vertical bearing 457 for the spindle 458, which at its lower end has an enlarged portion 459 that is shouldered as shown at 467. The bearing 457 has a threaded opening 461 at its upper portion, as also a lug 462.

A follower plate 463 is bolted to the slide 456 with the bolts 464 and engages the shouldered portion 465 of the connecting brace 438. At the top end of the spindle 458 is fastened the bevel gear 466, and at the shoulders 467 are bolted the journal arms 468 by the bolts 469. In the said journal arms 468 are supported the spindles 470, each of which carry the pinions 471 and the combined folding and closing wings 472. Bearing up against the cross-brace 438 is located the stationary folding cam 473 which is secured to the vertical bearing 457 by means of the screw 474. The lower edge 475 of the cam constitutes the acting surface thereof. In the threaded openings 476$^a$ are secured screw pins 476 that form pivots for the toothed sectors 477. Each toothed sector carries a roller 478 at its upper end, which engages with edge 475 of the folding cam, and its lower toothed edge 479 meshes with the pinion 471 on the spindle 470. Springs 480 are wound on the pins 476 and connect with the sectors as shown at 481 to bear the rollers 478 against the edge 475 of the cam 473. An operating handle 482 has the right handed thread 483 and left handed thread 484, which engage with the threaded openings 461 of the slides 456. On the brace 438 are secured the stops 485 for the handle 482. To the lugs 462 are bolted the guides 486, that engage with grooves 487 of the hubs 488 of the bevel gears 489, that mesh with the bevel gears 466, and can slide on the shaft 450. To the cross-brace 438 are bolted the brackets 490, which have the journal bearings 491, that support the shaft 492 to which latter is secured the flap closer 493. On one end of the shaft 492 are pinned the links 494, which in turn are pinned to the cam lever 495, that has an elongated opening 496, that straddles the shaft 450. On the end of the latter shaft is fastened the double cam disk 497 with the steps 498 that engage with the roller 499 on the cam lever 495. A spring 500 is attached to the end of the cam lever 495 and to the pin 501 extending from the frame 101.

From the frames 100 and 101 (for details see Fig. 94) extend the guides 505 and 506 in which are located the upper cross-heads 507, and the lower cross-heads 508. In the said upper cross-heads 507 is journaled the shaft 509, carrying the upper delivery belt roll 510, which has bearings 511 formed therein for the upper delivery belt 550. Caps 513 of the guides 505 and 506 engage screws 514 having hand wheels 515 and collars 516. The latter are held in cavities in the cross-heads 507, by means of cover plates 517. In the lower cross-heads 508 is journaled the shaft 518 for the lower rear delivery roll 519, similar to the roll 510. On the shaft 518 is secured a spur gear 520 which meshes with a gear 521 on the shaft 509. A bevel wheel 522 on the shaft 518 meshes with the bevel wheel 523 on the side shaft 582. At the ends of the frames 100 and 101 are bolted (see details Figs. 95 to 98) the delivery roll brackets 526, 527, each having open bearings 528. The bearings 528 support the shaft 531 and the said brackets have bearings for the shaft 532. A bracket 534 with bearing 533 is bolted to the side frame 100 for the side shaft 582. To the shaft 531 is attached the delivery roll 535, and to the shaft 532 is attached the delivery roll 536. On the shaft 531 is fastened a spur gear 537 which meshes with a spur gear 538 on the shaft 532. The gear 538 meshes with a pinion 539 on the pin 540, and the pinion 539 meshes with the gear 520. A stationary shaft 541 is fastened in the frames 100 and 101, which carries the hangers 542 with idlers 543, and belt pulleys 544 similar in construction to the pulleys 353 with their appurtenances are connected with the shaft 541. The upper delivery belts 550 run from under the roller 510 to and over the rollers 672 on the shaft 450, thence over the rollers 353, then against the idlers 349, to and under the roller 286 and back to the roller 510. The lower delivery belts 551 run from and over the lower belt roller 519 to and under the rollers 544, thence against the idlers 543, then over the roller 290 and finally back to the roller 519.

Bearings 552 are formed in the frames 100 and 101 for the driving shaft 553 on which is supported a pulley 670 and a hand wheel 671. On the end of the shaft 553 outside of the frame 100 (for details see Figs. 39— and 40) is fastened the pinion 554, which meshes with an idler gear 555, carried on an adjustable bracket 556, the latter being pivoted on the belt roller shaft 289. The latter shaft has fastened to it the gear 557 which meshes with the idler gear 555, and also meshes with the gear 558, which is fastened to the shaft 285 of the upper belt roller 286. A second idler gear 559 is journaled on a pin 560, which meshes with the gear 561 on the shaft 330 of the supporting roller 331. On the end of the shaft 330 is fastened the bevel gear 562 which meshes with the bevel gear 563 that is fastened to the side shaft 582. On the other end of the shaft 553 (for details see Figs. 41 and 42) and under the table 105 is fastened the pinion 564. On the said shaft 553 is supported the adjustable bracket 565 with the elongated opening 566. On the bracket 565 is journaled an idler gear 566 by means of the journal pin 567, and which meshes with the pinion 564. The idler gear 566 also meshes with the gear 568 on the shaft 229 of the supporting blocks of the initial knives.

On the knife shaft 207 (for details see Figs. 44 and 45) is fastened a gear 570 that meshes with an idler gear 571, the latter being journaled on a pin 572 on the adjustable bracket 573, and the gear 571 meshes with the gear 673 on the shaft 265. The bracket 573 is fulcrumed on the shaft 265 of the combined opener and folder. It contains at its outer end the elongated opening 574 through which passes a bolt 575, that screws into the side frame 100. A handle 576 extends from the said bracket 573.

To the frame 100 of the machine are bolted the journal brackets 580 and 581 which in conjunction with the bracket 534 support the main side shaft 582. The adjustable side shaft 590 is journaled above and parallel to the main side shaft 582, in the journal bracket 591 extending from the cross-head 203, the journal bracket 592 extending from the cross-head 321, and the journal bracket 593 extending from the cross-head 356. The said adjustable side shaft 590 has fastened thereto the bevel gears 594, 595, 596, which mesh respectively with the bevel gears 597, 598 and 599.

On each side of the machine is journaled a shaft 600 in journal brackets 601. Each of the shafts 600 carries a sprocket chain wheel 602, which are connected by a sprocket chain 603. On one of the shafts 600 is secured a crank handle 604. At one end of each of the shafts 600 is fastened a bevel gear 605 which meshes with a bevel gear 606 (for details see Fig. 89) connected to a screw with right handed threads 607 at one end, and left handed threads 608 at the other end. Collars 609 and 610 extend from said screw.

Journal brackets 611 and 612 are fastened to the side frames, and bear up against the collar 609 and 610. The threads 607 engage with the threaded openings in the cross-heads 203 and 204, and the threads 608 engage with threaded openings in cross-heads 205 and 206. To the side frames there are secured journal brackets 613 and 614 which support the shafts 600, and the vertical shafts 615. On the upper ends of the shafts 615 are formed the right handed threads 616 that engage with the threaded openings in the cross-heads 321 and 322. Journal brackets 617 support the shafts 615 and collars 618 on said shafts bear on the brackets 617. Bevel gears 619 on the shafts 600 mesh with bevel gears 620 on the vertical shafts 615. Collars 621 on the shafts 615 bear on the journal brackets 613. Journal brackets 622 and 623 support the vertical shafts (for details see Fig. 93) with the right handed threads 624 and the left handed threads 625. Collars 626 and 627 bear respectively on the journal brackets 623 and 622. The right handed threads 624 engage with threaded openings in the cross-heads 356 and 357, and the left handed threads 625 engage with threaded openings in the cross-heads 358 and 359. Bevel gears 630 mesh with bevel gears 631 on the shafts 600. On one of the members of the guides 354 (for details see Fig. 45) is marked a scale 650, and a pointer 651 is secured to the cross-head 356.

To operate the invention a roll 106 of paper or other material is rolled up the inclined platform 125 to bear upon the rollers 124, and the mandrel 111 is engaged with the openings in the cross-heads 110 to prevent the roll of material disengaging from the rolls 124. Next the horizontal rollers 121 are brought up against the ends of the paper roll 106 to maintain the latter in proper alinement. The machine is started by rotating the pulley through belting or other means not shown, and the driving shaft 553 will rotate. It will be noted that the shaft 553 can also be rotated by means of the hand wheel 671. When the driving shaft 553 turns, its rotation is transmitted to the shaft 229 through the train of gearing comprising the gears 564, 566 and 568. The position of the shaft 229 with the driving shaft 553 being variable by clamping the arm 565 in different positions on the frame 101 by means of the screw connected therewith. The rotations of the shaft 229 are communicated to the shaft 207, by means of the bevel gears 233 meshing with the bevel gear 239, the latter engaging the vertical shaft 234 through the spline 238. The rotations of the latter shaft are communicated to the shaft 207 by the bevel gears 232 and 237; the shaft 234 can be moved vertically with respect to the bevel gear 239. The bevel gear 597 on the shaft 207 meshing with the bevel gears 594 rotates the adjustable side shaft 490. The bevel gear 595 on the latter shaft meshing with the bevel gear 598 rotates the shaft 323 with the pasting appurtenances connected therewith. Again the bevel gear 596 on the shaft 590 meshing with the bevel gear 599 rotates the shaft 360 with its creasing and cutting knives. The rotations of the shaft 207 are communicated to the shaft 265 by means of the gears 570, 571 and 673. The bracket can be clamped in different positions by means of the bolt 575 to suit different positions of the shaft 207. The rotation of the shaft 360 is communicated to the shaft 368 with its guide blocks and appurtenances by reason of the bevel gear 362 meshing with the bevel gear 362ᵃ on the vertical shaft 363, which latter is in engagement with the bevel gear 370 that meshes with the bevel gear 367. The vertical shaft 363 can be moved vertically through the bevel gear 370 by reason of the spline 369. The bevel gear 447 on the shaft 590 meshing with the bevel gear 445 rotates the vertical shaft 440, which latter through the bevel gears 448 and 449 rotates the cross-shaft 450 that drives the appurtenances connected with the folding blades 472 and 493. The bevel gear 445 is vertically movable on the shaft 440 by virtue of the spline 446.

The spindles 458 rotate by virtue of the bevel gears 489 meshing with the bevel gears 466, which gives a horizontal rotating motion to the journal arms 468 in the directions of the arrows shown in Fig. 74ᵃ. When the arms are thus rotating the blades 472 oscillate with their axes 470 by virtue of the pinions 471 meshing with the sectors 477, which latter are moved by virtue of their rollers 478 engaging with the edges 475 of the folding cams 473. The flap closer 493 is actuated by reason of the roller 499 of the cam lever 495 engaging with the steps 498 of the cam 497.

The driving shaft 553 through the train of gearing 554, 555, 557, 559 and 561, 562 and 563 rotates the main side shaft 582, when the gear 555 meshes with the gears 554 and 557. The gear 555 being capable of being placed out of mesh with said two gears by lowering the bracket 556. The bevel gear 176 on shaft 582, meshing with the bevel gear 175 rotates the shaft 169, having the lower draw rollers 171. The shaft 169 transmits its rotations to the shaft 168 by the gear 177 meshing with the spur gear 706. The rotation of the shaft 169 is communicated to the crimping roll-shaft 191 through the gears 177, 179, 193, 707. The crimping rolls are caused to approach and recede from each other, by means of the actions of the cams 196, alternately raising and lowering the rollers 194 on the shaft 191, the clearances between the gears 193 and 707 allowing the same. The bevel gear 563 meshing with the bevel gear 562, communicates motion from the shaft 582 to the shaft 330 of the supporting roller 331. The rotation of the shaft 330 is communicated to the shaft 295 of the paste wheel 296, by reason of the bevel gear 335 meshing with the bevel gear 336, which latter drives the vertical shaft 338 with the bevel gear 341. The latter gear meshing with the bevel gear 340 rotates the said shaft 295. The bevel gear 523 meshing with the gear 522 rotates the shaft 518 of the delivering roll 519. The spur gear 520 on the shaft 518 meshing with the spur gear 521 transmits motion from the shaft 518 to the shaft 509 of the feed roll 510. The pinion 539 meshing with the spur gears 520 and 538 transmits rotation from the shaft 518 to the shaft 532 of the delivering roll 536. The rotation of the shaft 532 is communicated to the shaft 531 with the delivery roll 535, by reason of the spur gear 538 meshing with spur gear 537.

The shaft 590 can be either raised or lowered to allow the easy inspection of the appurtenances coacting therewith, and the introduction of appurtenances of different sizes to make bags of different lengths and sizes. To raise or lower the shaft 582, an operator turns the crank handle 604 when both the shafts 600 will rotate by reason of their connection with the sprocket chain 603. The rotations of the shafts 600 are communicated to the vertical shafts with the threads 624 and 625, through the bevel gears 630 and 631, and the said threads cause the cross-heads 356 and 358 to approach or recede from each other, the vertical movements of the cross-heads 356 being communicated to the shaft 590. The same action takes place between the shafts 600 and the cross-heads 321 and 203, 205.

The paste wheel 296 can be raised or lowered by turning the crank handle 308 which rotating the shaft 305, causes the screws with the threads 297 and 298 to rotate, the latter engaging with the cross-heads 293 and 294, which support the shaft 295 of the said paste wheel 296.

When the machine is operating, the paper roll 106 is unwound by the pulling action caused by the draw rolls 170 and 171, the rollers 124 turning with the paper roll, and the rollers 121 maintaining the proper alinement of the said paper roll. The paper strip which I will designate as 654 passes under the rollers 127, over the roller 143, and then under the convexed shoes 152 on its way to the folding wings 156, the initial pasting roller 140 pasting one edge 652 of the paper as it turns over the roller 143. The folding wings 156 fold the edge 652 of the paper over the edge 653. While the paper strip is being folded by the said folding wings it incloses between its folds the guide 153. The folded paper strip 654 comes next under the draw rolls 170 and 171, from which it passes on top of the table 105 and between the crimping rolls 188 and 192, where the folded strip of paper is crimped longitudinally at intervals as shown at 655. The intervals between the longitudinal crimps are produced by the lower roll 192 being lowered intermittently, by the action of the cam wheels 196 against the rollers 194. Next the prongs 154 and 155 sufficiently separate the top and bottom members 656, 657 of the folded strip 654, to permit the cutting knives 214 and 218, to cut the upper member 656 in a line as shown at 658 across the same, and to cut the two short longitudinal slits 659, while in the lower member 657 there are only cut the angular slits 660. The guide blocks 253 operate in conjunction with the cutter of the lines across both members and adjacent to the edges thereof. Next the combined opening and folding blade 282 enters between the top and bottom members of the folded strip of paper 654 and raises the upper member as the folding strip is traveling along. When the folding blade 280 approaches the upper member 656 the latter is clamped between the two blades 280 and 282. The pinion 278 travels up on the toothed sector 275, and finally the face 279 engages with the guide 272, by which action the edge portion of the upper member 656 is turned over. The action of the blades 280 and 282 is secured by reason of the rollers 271 engaging with the grooves 263 which oscillate the sectors 269, that mesh with the pinions 268. The pinions 268 oscillate the links 277 that carry the blades 280 and the pinions 278. As the pinions 278 engage the small sectors 283 the blades 280 and 282 are opened for a small interval of time, to allow the upper member to escape as it is being folded down. Then the folded strip is engaged with the delivery belt 550 and 551 between the folding rollers 286 and 290, which presses down the corners 662. The folded strip of paper is next carried by the delivering belts between the roller 331 and the spreaders 326 of the paste sector and causes paste to be delivered to the traveling and folded strip of paper, as indicated at 663, comprising a U-shaped surface of paste. The spreaders obtain their paste from the paste wheel 296 and paste box 315. The folded strip 654 travels by means of the delivery belts, under the cutting-off blades 401, then under the creasing knives 394 and 381 with their respective guide blocks 418 and 425, by means of which the creases 665 and 664 are formed. Next the flaps 667 and 668 by virtue of the action of the creases 664 and 665 are slightly raised. The partially formed bag now passes under the horizontally rotating combined folding and closing wings 472 which fold down the flap 667 and upon the farther travel of the bag, the flap closer 493 lifts and folds the flap 668 over the flap 667 when a bag with a satchel bottom is completed. The bag is then brought under the delivery rolls 510 and 519 which secures the pasting of the parts together, after which it is discharged by the delivery rolls 535 and 536.

It will be noted that the knives connected with the shaft 207, and the guide blocks connected with the shaft 229 can be adjusted at equal various distances from the said shafts. The train of gears 568, 566, and 564 being given the requisite proper pitch diameters so that the said shafts 207 and 229 will rotate their appurtenances, the knives and guide blocks at circumferential speeds which will equal the linear speeds of the paper strip as it is traveling through the machine, and thereby prevent the turning of the latter. By changing the pitch diameters of the gears 599 and 596 the shafts 360 and 368 can also be varied in speeds, so that the knives and crimpers with their guide blocks will travel with circumferential speed equal to the speed of the paper strip, the appurtenances connected with the shafts 360 and 368 being adjusted at different distances therefrom. These adjustments and the maintenance of equal speed are necessary if bags of different lengths are to be made with the machine.

Having described my invention I claim:

1. The combination in a bag making machine of a driving shaft, a main side shaft journaled at one side of the machine, connections between the shafts, a second side shaft journaled to the machine parallel to the first side shaft, connections between the latter shaft and the driving shaft, means to vary the distance between the longitudinal axes of the side shafts, three cross shafts journaled in the machine, connections between the cross shaft and the said second side shaft, knives carried on the first cross-shaft, a paste sector carried by the second cross shaft and creasing blades carried by the third cross-shaft.

2. The combination in a bag making machine of a driving shaft journaled therein, a main side shaft journaled in the machine, an adjustable side shaft journaled parallel to the main side shaft and on the same side of the machine, means to rotate both side shafts from the driving shaft, means to move the adjustable shaft to vary its distance from the main side shaft, three cross shafts, gearing connecting the cross shafts with the said adjustable shaft, adjustable knives coacting with the first cross shaft, a paste sector carried by the second cross shaft, and adjustable creasing blades coacting with the third cross-shaft.

3. The combination in a bag making machine of a cross-shaft journaled therein, a pair of toggle hubs slidably supported on the shaft, a pair of links pinned to each toggle hub, a knife holder connecting one of each pair of links, a cross knife clamped to each holder, and a pair of knives on each cross knife and perpendicular therewith, threaded lugs extending from the toggle hubs, a stop collar on the cross-shaft, an operating shaft journaled in the stop collar, a right handed screw at one end of the operating shaft and left handed screw at the other end thereof, the screws engaging with the threaded lugs to vary the distance between the latter and the distance of the knives from the cross shaft.

4. The combination in a bag making machine of a cross shaft journaled therein, a pair of toggle hubs slidably supported on the cross shaft, a pair of links pinned to each toggle hub, holders joining a link of one toggle hub with a link of the other, a guide block supported on each holder, a stop collar fastened to the cross shaft, an operating shaft journaled in the stop collar, threaded lugs extending from the toggle hubs, a right handed screw at one end of the operating shaft and a left handed screw at the other ends thereof, the screws engaging with the threaded lugs to vary the distance between the toggle hubs and distances of the guide blocks from the cross shaft.

5. The combination in a bag making machine of a pair of frames, guides extending from said frames, a couple of cross-heads in each frame, a couple of cross shafts, journaled in the accompanying cross-heads in the guides, cutting knives adjustably secured to one of the cross-shafts and guide blocks adjustably secured to the other cross-shaft, journal brackets extending from each of the cross-heads in one of the guides, a vertical shaft journaled in one of said brackets and slidably journaled in the other, a bevel gear fastened to the vertical shaft meshing with a bevel gear fastened to one of the cross-shafts, a bevel gear on the other cross-shaft meshing with the bevel gear slidably secured to the said vertical shaft, and means to vary the distance between the cross-shafts.

6. The combination in a bag making machine of a pair of frames, guides extending from said frames, a couple of cross-heads in each frame, a couple of cross shafts journaled in the accompanying cross-heads in the guides, cutting knives adjustably secured to one of the cross-shafts and guide blocks adjustably secured to the other cross-shaft, journal brackets extending from each of the cross-heads in one of the guides, a vertical shaft journaled in one of said brackets and slidably journaled in the other, a bevel gear fastened to the vertical shaft meshing with a bevel gear fastened to one of the cross-shafts, a bevel gear on the other cross-shaft meshing with the bevel gear slidably secured to the said vertical shaft, each two cross-heads in each guide connected by a screw with right handed threads engaging a threaded opening in one of said crossheads and left handed threads engaging a threaded opening in the other cross-head, and means to turn the screws for all the cross-heads in unison.

7. In a bag making machine the combination of a pair of rotating disks, a link pivoted on each disk, a folding blade connecting the links, a shaft connecting the swinging ends of the links, a combined opening and folding blade fastened to said shaft.

8. In a bag making machine the combination of a pair of rotating disks, a link pivoted on each disk, a folding blade connecting the links, a shaft journaled in the swinging ends of the links, a pinion fastened to each end of the shafts, a smooth curved edge formed in a portion of the circumferential edge of each pinion, a circular guide on each disk to engage said smooth curved edge, and a toothed segment on each disk to engage said pinions.

9. In a bag making machine the combination of a pair of rotating disks, a toothed sector journaled on one side of each disk, means to oscillate the toothed sectors in unison, a pinion journaled on each disk and meshing with the toothed sector thereon, a journal pin fastened with each pinion and passing through its disk, a link fastened to each of said journal pins on the side of the disk opposite to the toothed sectors, a folding blade fastened to and connecting the links, a shaft journaled in the swinging ends of the links, pinions fastened to the ends of the shaft, a smooth curved edge on each of the latter pinions, a toothed segment and a circular guide on the face of each disk opposite to the face with the sectors, the toothed segments located to engage with the pinions located on the same sides of the disks, and the circular guides located to engage with the smooth curved edges of the latter pinions.

10. In a bag making machine the combination of a pair of rotating disks, a toothed sector journaled on one side of each disk, rollers journaled in the sectors on the ends opposite to the teeth thereof, grooved cams located to engage with said rollers to oscillate the sectors in unison, a pin journaled on each disk and meshing with the toothed sector thereon, a journal pin fastened with each pinion and passing through its disk, a link fastened to each of said journal pins on the side of the disk opposite to the toothed sectors, a folding blade fastened to and connecting the links, a shaft journaled in the swinging ends of the links, pinions fastened to the ends of the shaft, a smooth curved edge on each of the latter pinions, a toothed segment and a circular guide on the face of each disk opposite to the face with the sectors, the toothed segments located to engage with the pinions located on the same sides of the disks, and the circular guides located to engage with the smooth curved edges of the latter pinions.

11. In a bag making machine the combination of a pair of housings, a shaft journaled therein, means to rotate the shaft, a pair of disks fastened to the shaft, a pair of toothed sectors pivoted on the accompanying faces of each disk, pinions journaled on each disk, the journal pins of the pinions extending through the disk, each one of the latter pinions meshing with one of the toothed sectors, rollers journaled on the sectors, grooved cams in the housings engaging with the said rollers, links fastened to the journal pins passing through the disks and on the sides of the latter opposite to the toothed sectors, a folding knife connecting each accompanying pair of links, a shaft journaled in the swinging ends of each accompanying pair of links, a pinion fastened to each end of each shaft, a combined opening and folding blade fastened to each shaft, a pair of toothed sectors on each disk for the latter pinions, a smooth curved edge on each of the latter pinions, and a pair of circular guides on each disk to engage with the said smooth curved edges.

12. The combination in a bag making machine of side frames, a pair of guides extending from the frames, two pairs of cross-heads in the guides, one above the other, a cross-shaft journaled in each pair of cross-heads, a third cross-shaft journaled in frames below the other cross shafts, means to locate the upper cross-shaft at different levels, other means to locate the second cross-shaft at different levels, a paste wheel fastened to the upper cross-shaft, a paste box located so that the paste wheel enters therein, a paste sector on the second shaft, a supporting roller on the third shaft, means to rotate all the shafts with their appurtenances in unison.

13. The combination in a bag making machine of side frames, a pair of guides extending from the frames, two pairs of cross-heads in the guides one above the other, threaded caps at the upper ends of the guides, a vertical screw engaging with each of said threaded caps, the lower end of each screw connected with one of the upper cross-heads, a double journal bracket with a vertical and a horizontal bearing above the said caps, a journal extending from each screw, engaging with the vertical bearing of the double journal bracket, a bevel gear extending from the end of each journal of the vertical screws, a horizontal shaft supported in the horizontal bearings of the double journal bracket, a bevel gear on each end of the horizontal shaft meshing with its accompanying bevel gear on the ends of the screws, means to turn said horizontal shaft supported in the double bracket, a pasting wheel on the cross-shaft supported in the upper crossheads, a pasting sector supported on the second cross-shaft in the guides, a shaft journaled below the shaft with the pasting sector and a supporting roller on the latter shaft.

14. In a bag making machine the combination of a pair of side frames, a guide formed with each frame, an upper crosshead in each guide, an upper cross-shaft journaled in the upper cross-heads, a lower cross-head in each guide, a lower cross-shaft journaled in the lower cross-heads, a journal bracket extending from one of the upper cross-heads, a journal bracket extending from one of the lower cross-heads, a vertical shaft journaled in the bracket extending from the upper cross-head and extending through the bracket of the lower cross-head, a bevel gear on the vertical shaft and a bevel gear on the upper cross-shaft, the said gears meshing with each other, a bevel gear on the lower cross-shaft, and another bevel gear on the vertical shaft and engaging with a spline on said vertical shaft, the two latter gears meshing with each other, means to change the distance between the cross-shafts, toggle hubs slidably supported on the upper cross-shaft, and toggle hubs slidably supported on the lower cross-shaft, creasing blades and a knife blade coacting with the toggle hubs on the upper cross-shaft, and guide blocks for the said blades coacting with the toggle hubs on the lower cross-shaft.

15. In a bag making machine, the combination of a pair of side frames, a guide formed with each frame, an upper crosshead and a lower cross-head in each guide, an upper cross-shaft journaled in the upper cross-heads, and a lower cross-shaft journaled in the lower cross-heads, a pair of toggle hubs slidably supported on each cross-shaft, creasing blades and a knife blade coacting with the toggle hubs on the upper cross-shaft, guide blocks coacting with the toggle hubs on the lower crossshaft, a stop collar secured to each of the cross-shafts, an operating shaft journaled in each stop collar and parallel with its accompanying cross-shaft, a right handed thread formed on one end of each operating shaft and a left handed thread formed on the other end thereof, lugs on toggle hubs threaded and engaging with the threads of the operating shafts, so as to adjust the toggle hubs in different positions on the crossshafts.

16. In a bag making machine the combination of a rotating cross-shaft, a bevel gear slidably supported on said shaft, a vertical spindle adjustably supported below the cross-shaft, a bevel gear on the spindle, the bevel gears meshing with each other, a pair of journal arms extending from the vertical spindle, a horizontal spindle supported in each journal arm, a pinion on each horizontal spindle, a pair of toothed sectors pivoted on the vertical spindle and meshing with the pinions, a stationary cam over the sectors and engaging therewith, a folding and closing wing at the swinging end of each horizontal spindle, and a swinging flap closer coacting with the folding and closing wings.

17. In a bag making machine the combination of a rotating cross-shaft, a bevel gear slidably supported on said shaft, a vertical spindle adjustably supported below the cross-shaft, a bevel gear on the spindle, the bevel gears meshing with each other, a pair of journal arms extending from the vertical spindle, a horizontal spindle supported in each journal arm, a pinion on each horizontal spindle, a pair of toothed sectors pivoted on the vertical spindle and meshing with the pinions, a stationary cam over the sectors and engaging therewith, a folding and closing wing at the swinging end of each horizontal spindle, a shaft journaled below the cross-shaft and parallel thereto, a flap closer on the latter shaft, and a cam lever also connected thereto, a cam connected to cross-shaft to actuate the cam lever.

18. In a bag making machine the combination of a table, a cross-brace supported over the table, a pair of slides supported on the cross brace, means to vary the distance between the slides, a pair of splines on the cross-shaft, bevel gears slidably supported on the cross-shaft by means of the splines, vertical bearings extending from the slides, a vertical spindle, supported in each of the vertical bearings, a pair of horizontal arms extending from each vertical spindle, a horizontal spindle journaled in each horizontal arm, a pinion on each horizontal spindle, a pair of toothed sectors pivoted to each vertical spindle, a roller journaled in one end of each sector, a cam attached to each vertical bearing engaging with a pair of the toothed sectors, a folding and closing wing extending from each horizontal spindle, journal brackets extending from the cross-brace, a second shaft journaled in said brackets, a cam lever straddling the cross-shaft and connected to the second shaft, a cam on the cross-shaft actuating the cam lever, and a flap closer attached to the second shaft.

19. In a bag making machine the combination of side frames, guides in the frames, a pair of cross-heads in the guides, a shaft journaled in the cross-heads, cutting knives connected to the shaft, a second shaft journaled in the machine parallel to the first shaft, opening and folding blades actuated by the second shaft, an adjustable bracket fulcrumed on the second shaft, a gear on each shaft, and a gear journaled on the bracket meshing with the other two gears, and means to clamp the bracket in different positions to enable the meshing of the gears when the first shaft is located in different positions.

20. In a bag making machine the combination of side frames, a table connecting the frames, a pair of cross-shafts journaled in the machine on opposite sides of the table, a folding roller on each of said shafts, a driving shaft in the machine, a side shaft journaled parallel to one of the frames, a train of gearing between the driving shaft and one of the cross-shafts and the side shaft, a gear on each of the cross shafts meshing with each other, a second pair of cross-shafts journaled in the machine on opposite sides of the table, a delivery roll fastened to each of the latter shafts, a spur gear on each of the latter shafts meshing with each other, a train of gearing between the side shaft and one of the latter shafts, an idler pulley adjustably located above the table, and an idler pulley adjustably located below the table, a delivery belt passing around the folding roller, delivery roller and against the idler above the table, a second delivery belt passing through openings in the table over the top surface of the same and parallel to the horizontal portion of the other belt and passing over the folding roller, delivery roller and idler under the table.

Signed at South Windham in the county of Windham and State of Connecticut this 19th day of Jan. A. D. 1907.

ANDERS JOHAN WIKANDER.

Witnesses:
CARL E. OMAN,
EMIL ERICKSON.